(12) United States Patent
Carpenter

(10) Patent No.: US 11,567,171 B1
(45) Date of Patent: Jan. 31, 2023

(54) SYSTEMS AND METHODS FOR RADAR SIGNATURE MODELING USING A ROTATING RANGE PROFILE REDUCED-ORDER MODEL

(71) Applicant: Ansys, Inc., Canonsburg, PA (US)

(72) Inventor: Shawn Raymond Carpenter, Canonsburg, PA (US)

(73) Assignee: Ansys, Inc., Canonsburg, PA (US)

( * ) Notice: Subject to any disclaimer, the term of this patent is extended or adjusted under 35 U.S.C. 154(b) by 1124 days.

(21) Appl. No.: 16/155,054

(22) Filed: Oct. 9, 2018

Related U.S. Application Data

(60) Provisional application No. 62/608,873, filed on Dec. 21, 2017, provisional application No. 62/569,738, filed on Oct. 9, 2017.

(51) Int. Cl.
  *G01S 7/295* (2006.01)
  *G01S 7/41* (2006.01)
  *G06T 15/06* (2011.01)

(52) U.S. Cl.
  CPC ............. *G01S 7/412* (2013.01); *G01S 7/295* (2013.01); *G06T 15/06* (2013.01)

(58) Field of Classification Search
  None
  See application file for complete search history.

(56) References Cited

U.S. PATENT DOCUMENTS 6,529,157 B1 * 3/2003 Mensa .................... G01S 7/412
                                                          342/174

9,734,703 B1 * 8/2017 Chhabra ............. H03M 1/0643
2016/0282457 A1 * 9/2016 Mazzaro ................ G01S 7/414
2017/0307732 A1 * 10/2017 Haghighi ............. G01S 7/4056

FOREIGN PATENT DOCUMENTS

JP          2002048859 A   *   2/2002

* cited by examiner

*Primary Examiner* — Erin F Heard
*Assistant Examiner* — Hailey R Le
(74) *Attorney, Agent, or Firm* — Jones Day

(57) ABSTRACT

Systems and methods are provided for generating a radar model for a target object. In embodiments, a target simulation model is received that represents one or more physical aspects of a target object, an environment simulation model is received that represents one or more physical aspects of an environment object, and a target distance parameter is received that identifies a reference distance between the target object and a radar system to be simulated. A simulation model is generated based, at least in part, on the target simulation model, the environment simulation model, and the reference distance, and further based on a target aspect angle that identifies an angular position of the target object in relation to the radar system. Interaction of the radar system with the target object and the environment object is simulated using the simulation model, and results of the simulation are used to generate a range profile for the target object at the target aspect angle, wherein the range profile identifies a radar return strength for the reference distance. The target aspect angle is then incremented, and the operations are repeated until range profiles are generated for the target object at a plurality of target angles amounting to a 360 degree rotation of the target object. The range profiles at the plurality of target angles are then accumulated to generate the radar model for the target object.

20 Claims, 25 Drawing Sheets

SYSTEMS AND METHODS FOR RADAR SIGNATURE MODELING USING A ROTATING RANGE PROFILE REDUCED-ORDER MODEL

CROSS-REFERENCE TO RELATED APPLICATIONS

This application claims priority to U.S. Provisional Application No. 62/569,738, filed Oct. 9, 2017, and U.S. Provisional Application No. 62/608,873, filed Dec. 21, 2017, both of which are incorporated herein by reference in their entireties.

TECHNICAL FIELD

The technology described herein relates generally to radar signature modeling.

BACKGROUND

Simulation of automotive safety and autonomous vehicle systems typically includes the computer simulation of safety system sensors, such as radars, lidars, visual cameras, ultrasonic sensors, etc. Such computer simulations often require the simulation of hundreds of thousands of scenarios involving millions of simulation miles in order to test, refine and validate system processes, such as sensor signal processing algorithms, safety system control algorithms, autonomous vehicle artificial intelligence (AI) algorithms, and others. The only viable alternative to simulation is a cycle of building, testing and driving prototypes on real vehicles, which is often too costly in terms of time and effort.

High quality testing of radar sensors through simulation typically requires high-fidelity computer models of anticipated targets that the radar must track. Such high-fidelity computer models should accurately represent the response of a real radar system to real surroundings. Realism of the target, the radar system, and the radar waveform is necessary to derive a low-level radar return model with sufficient accuracy to be useful for high-fidelity driving simulations. Target simulation models (e.g., vehicles, signs, fences, guardrails, etc.) should have realistic structure and should exhibit radar signal scattering consistent with the shape and dielectric properties of their parts. Radar models should accurately model the real radar system's distribution of electromagnetic waves for both transmit and receive antenna systems. The radar waveform directly impacts the range measurement resolution of the radar, and should thus be considered in the full-physics modeling of the radar-environment-target interaction. However, the generation of such high-fidelity radar return models, based on full-physics simulations, can often be time-consuming, particularly when modeling an environment with a size matching the maximum range of most automobile radars.

SUMMARY

Systems and methods are provided for generating a reduced-order high fidelity radar model for a target object. In embodiments, a target simulation model is received that represents one or more physical aspects of a target object, an environment simulation model is received that represents one or more physical aspects of an environment object, and a target distance parameter is received that identifies a reference distance between the target object and a radar system to be simulated. A simulation model is generated based, at least in part, on the target simulation model, the environment simulation model, and the reference distance, and further based on a target aspect angle that identifies an angular position of the target object in relation to the radar system. Interaction of the radar system with the target object and the environment object is simulated using the simulation model, and results of the simulation are used to generate a range profile for the target object at the target aspect angle, wherein the range profile identifies a radar return strength for the reference distance. The target aspect angle is then incremented, and the operations are repeated until range profiles are generated for the target object at a plurality of target angles amounting to a 360 degree rotation of the target object. The range profiles at the plurality of target angles are then accumulated to generate the reduced-order radar model for the target object.

DETAILED DESCRIPTION

Embodiments of the systems and methods described herein may be used to generate a rotating range profile reduced-order radar model (RRP-ROM) for use in high-speed, closed-loop radar sensor system and autonomous vehicle simulation. An RRP-ROM may provide radar signature characteristics of an electrically large target (such as an automobile at 77 GHz) over a range of prescribed aspect angles, and over a finite range measured about its center rotation axis. These models may include the key interaction effects of extended road, ground, ceiling, wall and other continuous environment interaction effects.

Through use of RRP-ROM models, an accurate target simulation model may be derived through offline simulation for a target and its interaction with an extended environment in order to capture, within a prescribed localization range, the target and its environment interaction effects. A typical target's distributed radar signature will vary depending on the aspect angle. In order to account for this variance, a target radar signature is stored in the RRP-ROM model for a descritized range of aspect angles.

The resulting RRP-ROM target simulation model may be combined in large-scale environment simulations with other such target simulation models that are accessed, for example, as lookup tables. The high-fidelity but localized target simulation model provided by a RRP-ROM may, for example, be applied to a large-scale closed-loop safety system or autonomous vehicle simulation by identifying the indicated target's direction and orientation, and reading back the radar response using a data lookup table (scaling for range, position of the target within the antenna's radiation pattern, and radar transmit power levels.) In this way, RRP-ROM models may enable high-speed simulation of accurate radar responses to a prescribed target so that automotive safety and autonomous control scenarios may be evaluated at speeds that significantly exceed real-time.

Figure 1:
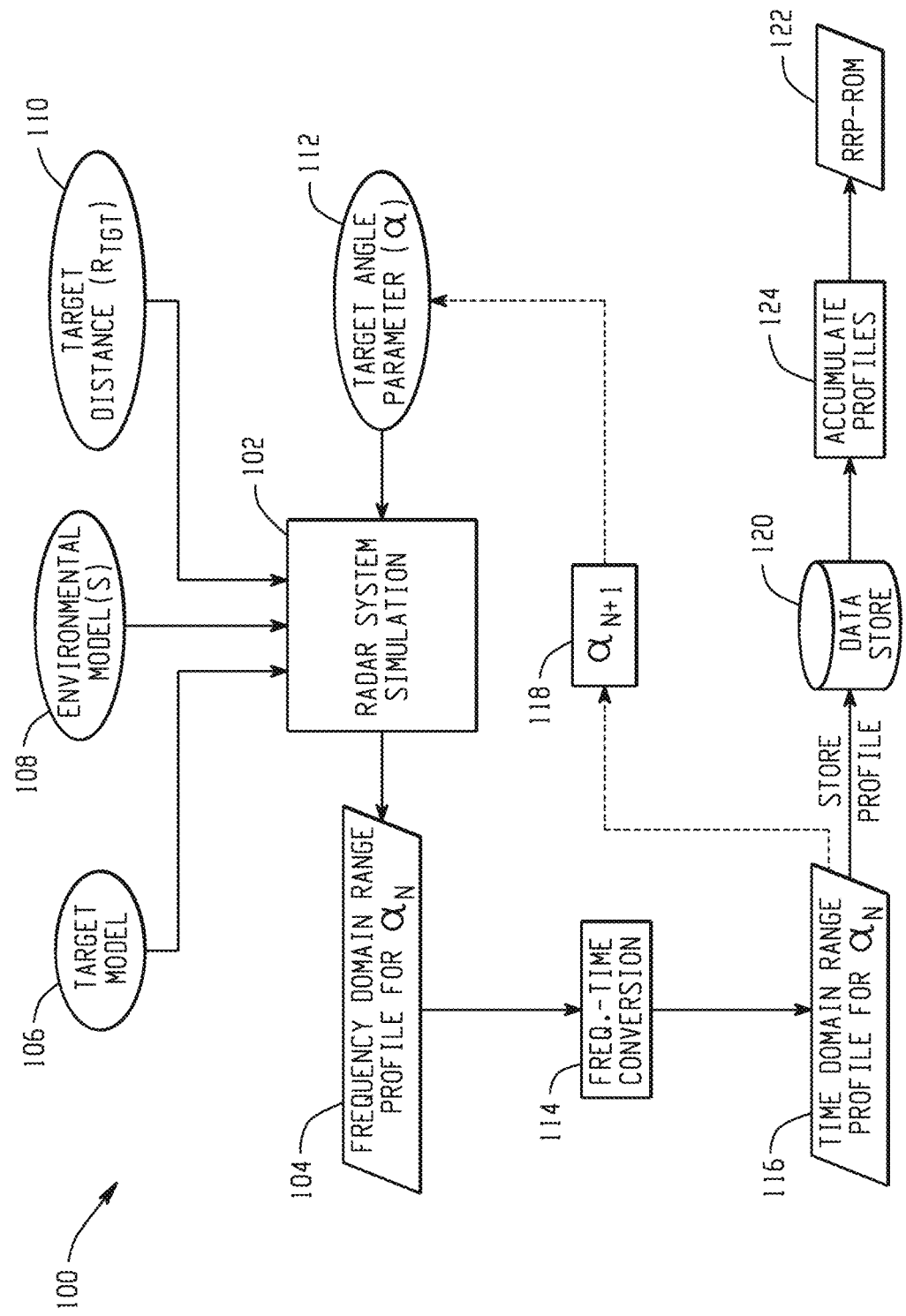
FIG. 1 is a block diagram illustrating an example system for generating a rotating range profile reduced-order radar model (RRP-ROM).

FIG. 1 is a block diagram illustrating an example system 100 for generating a RRP-ROM. The system 100 includes a radar system simulation module 102 that generates a frequency domain range profile 104 for a target object based on CAD models 106, 108 for the target object and one or more environment objects, a prescribed target reference distance (Rtgt) 110, and a target aspect angle ($\alpha$) 112. The system 100 further includes a frequency-to-time conversion module 114 that converts the frequency domain range profile 104 into a time domain range profile 116, and a target aspect angle incrementation module 118 that varies the target aspect angle ($\alpha$) 112 in discrete increments to generate a 360° range of target profiles. The target range profiles are stored in memory 120, and are accumulated into a RRP-ROM 122 by an accumulation module 124.

The radar simulation module 102 creates a simulation model composed of a model of the radar system (at origin), the target simulation model 106, and the environment simulation model 108. The target object defined by the target simulation model 106 is configured within the simulation model based on the prescribed target reference distance (Rtgt) 110 and target aspect angle ($\alpha$) 112, such that the target object is positioned with its center at the prescribed reference distance (Rtgt) 110 from the radar and is rotated about its center axis of rotation by the target aspect angle ($\alpha$) 112. Using the simulation model, the radar simulation module 102 performs a full-physics electromagnetic simulation of the radar scattering from the radar transmit antenna, for example using a shooting and bouncing rays (SBR) simulation technique. An illustration of an example SBR simulation 200 being performed on a simulation model is shown in FIG. 2.

Figure 2:
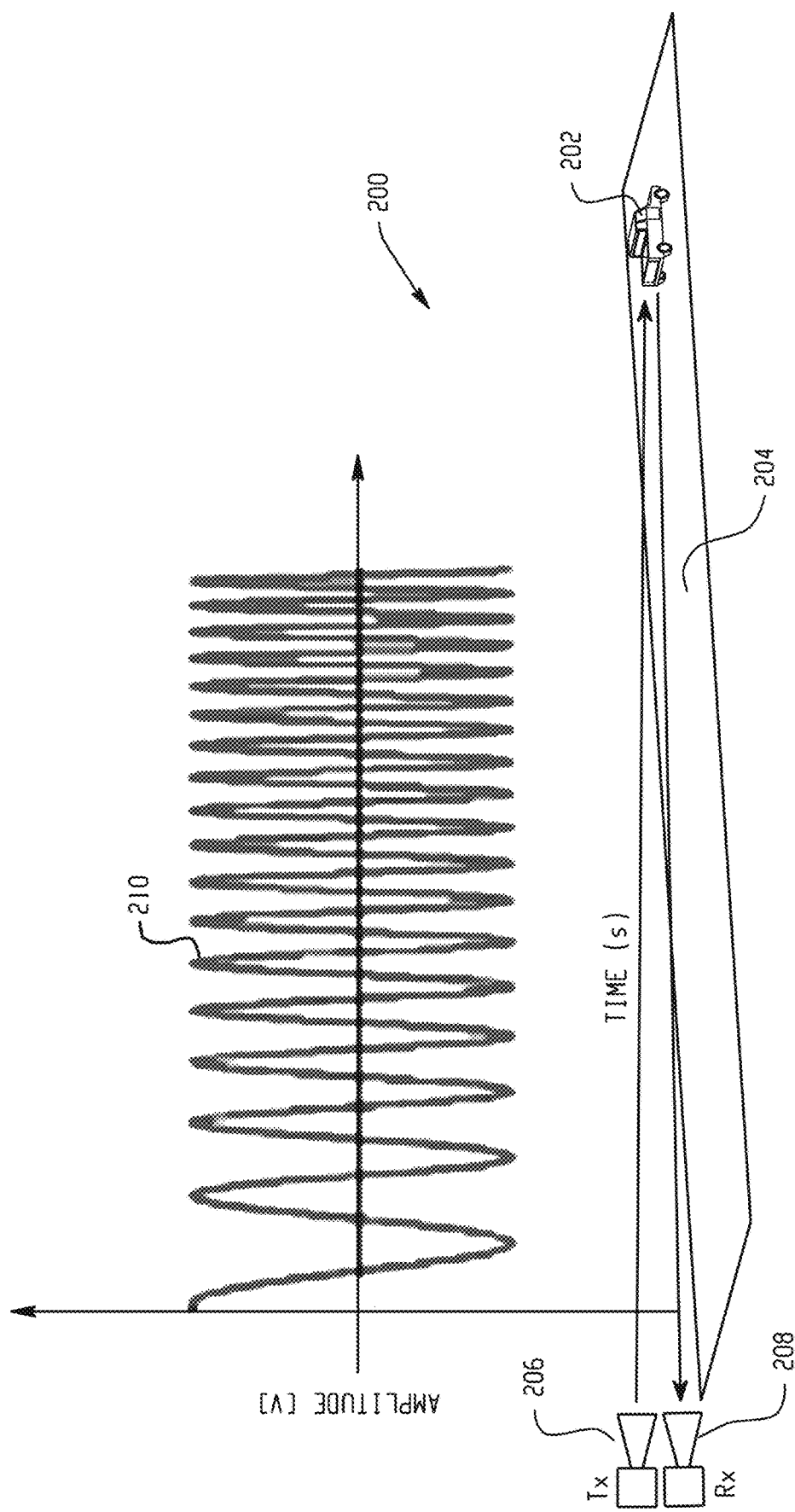
FIG. 2 illustrates an example of a shooting and bouncing rays (SBR) radar simulation.

The example SBR simulation 200 illustrated in FIG. 2 is performed on a simulation model composed of the radar model, a target CAD model of a vehicle 202, and an environment CAD model of a road 204. In the illustrated example, the target aspect angle ($\alpha$) is 180°, causing the target vehicle 202 to be rotated 180° about its center axis of rotation (i.e., facing away from the radar.) The target reference distance (Rtgt) is the distance from the center of the target vehicle 202 to the radar system antennas 206, 208.

In operation, the SBR simulation 200 uses a single linear frequency modulated (LFM) pulse (chirp) simulation 210 to generate a frequency domain range profile of the target 202 at the prescribed target aspect angle ($\alpha$) and reference distance (Rtgt). As shown in FIG. 2, the simulation 200 analyzes an LFM pulse 210 that is transmitted from a radar transmit antenna 206, bounced off of the target vehicle 202 (including any interaction effects from the environment 204), and received by a radar receive antenna 208. Each radar antenna may have a unique radiation pattern that describes the manner in which energy is distributed or collected by the antenna. Using an antenna-to-antenna coupling simulation, the SBR technique is made to yield scattering parameter (S-parameter) data representing the coupling between the transmit and receive antennas. S-parameters from the SBR technique are separated into incident field parameters (coupling with no scattering geometry) and scattered field parameters (coupling due to currents stimulated on the target and environment.) The scattered S-parameters may be extracted using a swept-frequency analysis, and are used to represent a full transmit-environment-receive loop in the frequency domain range profile 104. In embodiments, the SBR simulation 200 may, for example, be performed using the HRSS SBR+ advanced antenna performance simulation software sold by Ansys, Inc. headquartered in Canonsburg, Pa.

With reference again to FIG. 1, the frequency domain range profile 104 is processed by the frequency-to-time conversion module 114 using an inverse Fast-Fourier Transform (FFT) to generate a time domain range profile 116 at the prescribed target aspect angle ($\alpha$) and reference distance (Rtgt). More specifically, the result of performing an inverse FFT on the frequency domain range profile 104 is a radar time profile that represents the radar waveform echo from the environment as observed at the terminals of the receive antenna (in square-root voltage complex samples.) The radar time profile is multiplied by the speed of light to generate the time domain range profile 116, which is stored in memory 120.

Figure 3:
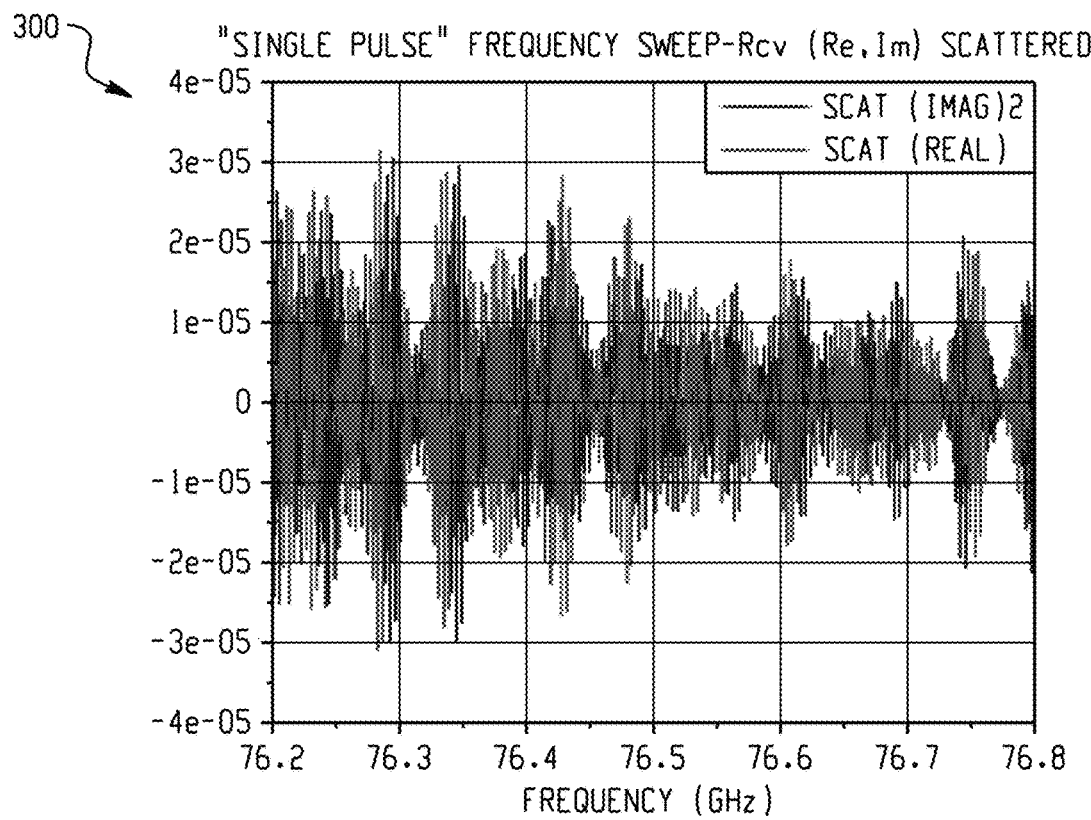
FIG. 3 depicts an example of a frequency domain range profile.
Figure 4:
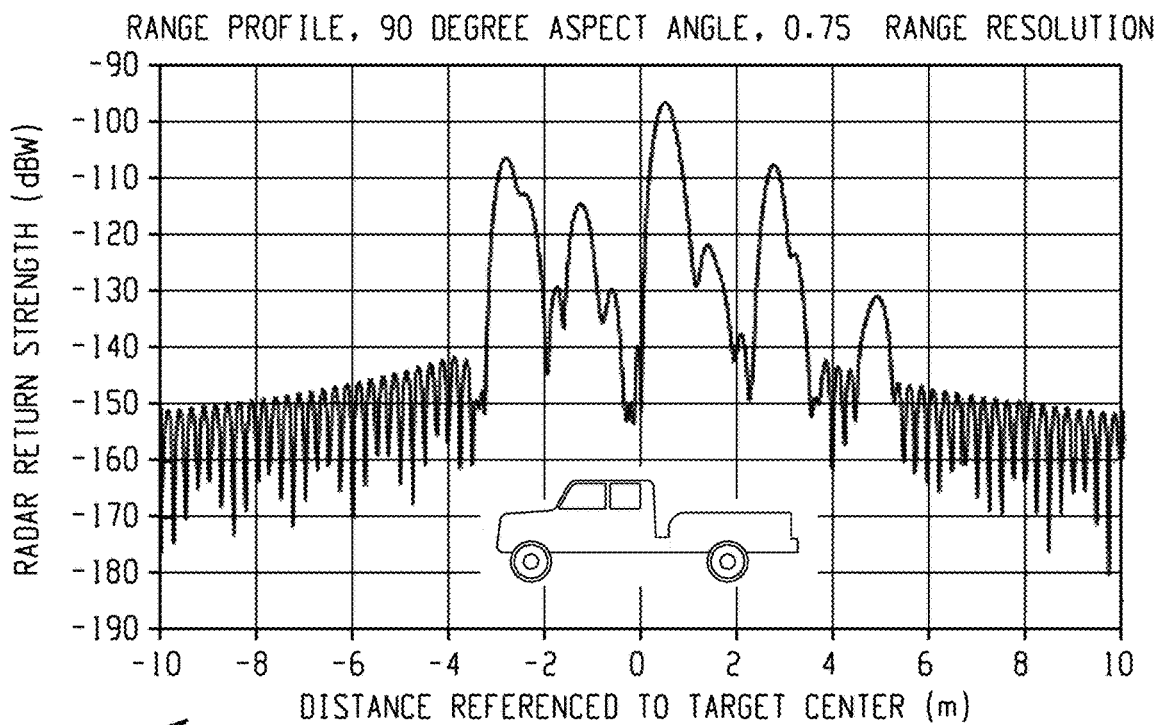
FIG. 4 depicts an example of a time domain range profile.

Examples of the frequency domain range profile 104 and the time domain range profile 116 are shown in FIGS. 3 and 4, respectively. Specifically, FIG. 3 illustrates an example frequency domain range profile 300 that includes scattered S-parameters extracted using a swept-frequency analysis of a single pulse frequency sweep, as explained above with reference to FIG. 2. As shown, the frequency domain range profile 300 is a complex voltage that includes both the real (Scat (Real)) and imaginary (Scat (Imag)) components of the scattered S-parameters. The target return strength (complex voltage) in the frequency domain range profile 300 is a function of range (e.g., a window around the target body center) and the target aspect angle ($\alpha$). The resolution of the range may be set by the bandwidth of the radar waveform used in the radar model.

FIG. 4 illustrates an example time domain range profile 400 for a target vehicle at a 90° target aspect angle and having a 0.75 m range resolution. As shown, the time domain range profile 400 identifies the radar return strength (dBW) over a range margin from the target center. The range margin captures the radar profile over the extents of the target body plus an additional margin (e.g., target extent +/−50%). The time domain range profile 400 is illustrated in FIG. 4 in the form of a graph with a picture of a target vehicle overlaid to help illustrate the range resolution and target aspect angle. It should be understood, however, that the overlaid picture of the target vehicle is not part of the time domain range profile.

With reference again to FIG. 1, after creation of the time domain profile 116, the target aspect angle (α) is incremented by the target aspect angle incrementation module 118, and the simulation process is repeated for the new target aspect angle (α) 112. This continues until time domain range profiles 116 have been generated and stored to memory 120 for each aspect angle (α) within a 360° rotation of the target. In the illustrated example, the target aspect angle (α) is shown being incremented by 1 (i.e., αN+1) at each iteration of the 360° rotation. It should be understood, however, that different increment amounts may be utilized, depending on the desired resolution of the resultant RRP-ROM 122.

Once time domain range profiles 116 have been generated and stored for each aspect angle (α) in the 360° target rotation, the resultant set of time domain range profiles are accumulated 124 to generate the RRP-ROM 122. The RRP-ROM 122 includes a matrix of radar returns which may, for example, be indexed by range bins on one axis and target aspect angles on the other axis. Examples of a RRP-ROM matrix 122 for a target vehicle are illustrated in FIGS. 5 and 6 for different radar waveforms.

Figure 5:
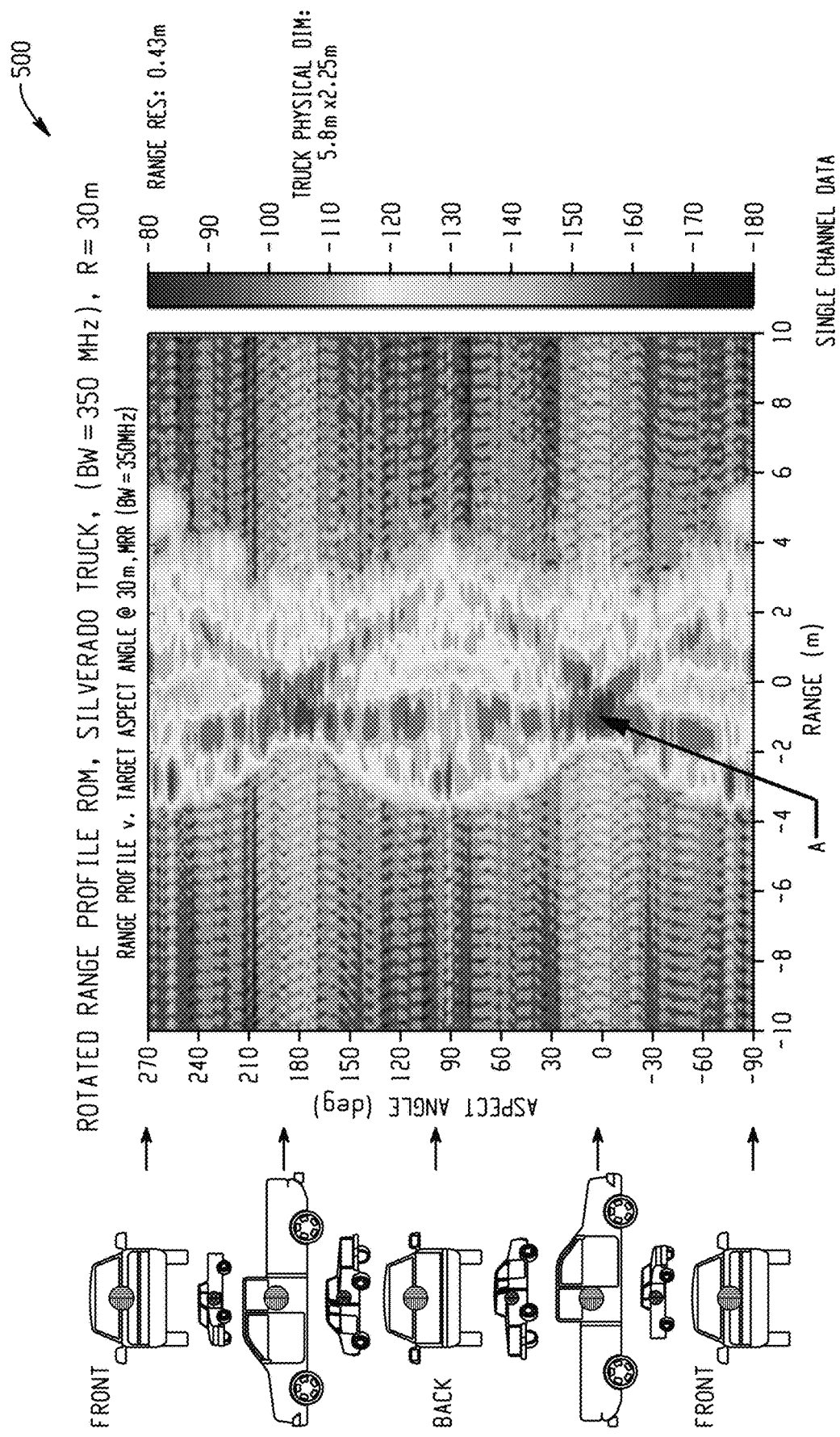
FIG. 5 depicts an example RRP-ROM matrix for a target vehicle in an environment that includes a road surface and a radar with range resolution of 0.43 m.
Figure 6:
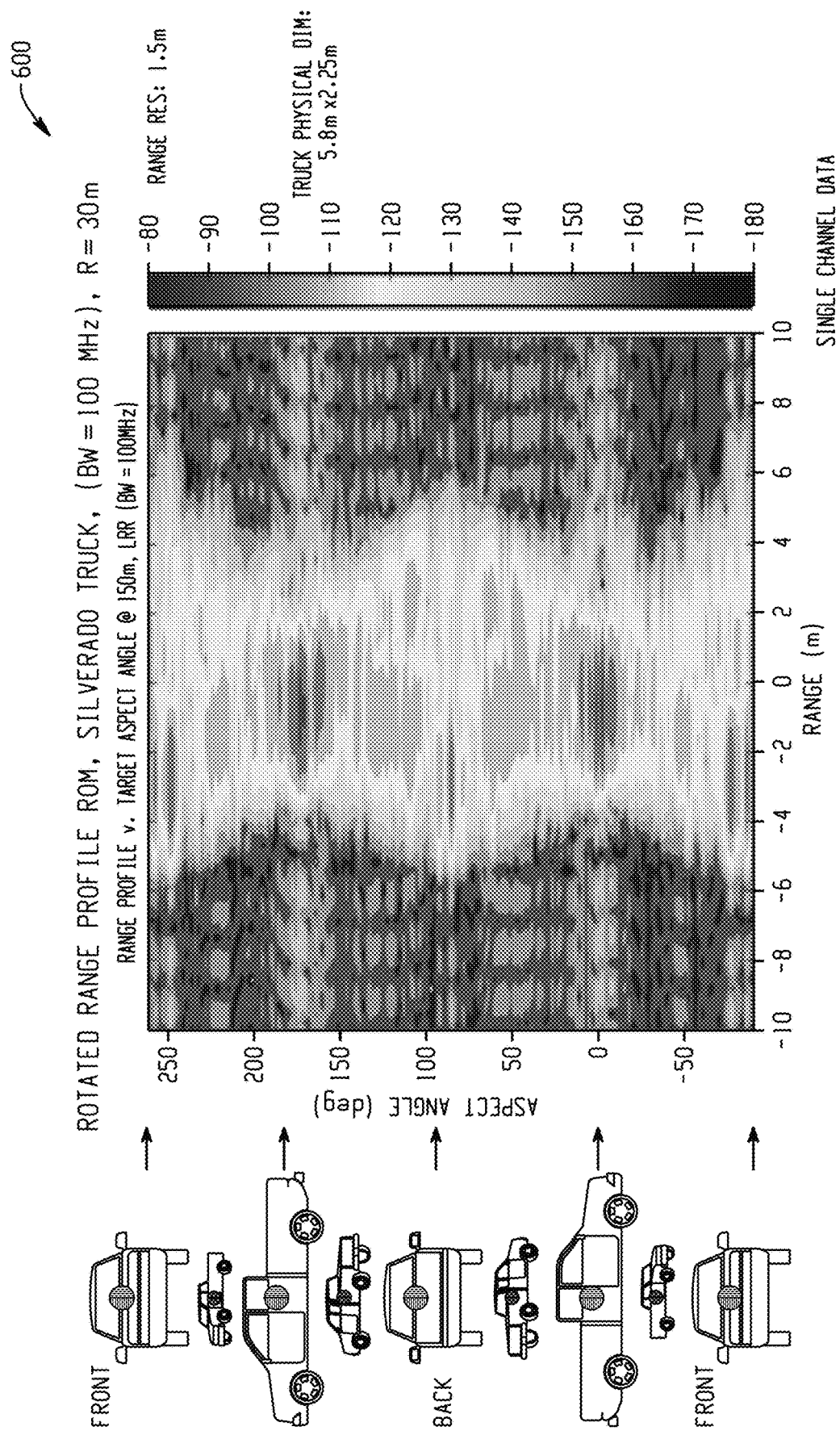
FIG. 6 depicts another example RRP-ROM matrix for a target vehicle in an environment that includes a road surface and a radar with range resolution of 1.5 m.

FIG. 5 shows an example RRP-ROM matrix 500 for a target vehicle in an environment that includes a road surface. The illustrated RRP-ROM matrix 500 shows the radar return strengths (dBW) from the target in the form of a heat map on a graph, where the y-axis of the graph represents the target aspect angle (α), the x-axis represents the range margin from the target center, and the radar return strength is represented on the graph by a graduated heat index (e.g., by a color gradient). Using the illustrated RRP-ROM matrix 500, the radar return strength may be determined at each target aspect angle (α) at any distance within the range margin. For example, the illustrated RRP-ROM matrix 500 shows a radar return strength of approximately −85 dBW at the point labeled "A" on the graph, which corresponds to a target aspect angle (α) of zero and a range of approximately .75 meters—uprange of target center.

Also shown to the left of the graph in FIG. 5 are pictures of the target vehicle at various aspect angles to help visualize the aspect angles included in the graph. In the illustrated examples (FIGS. 5 and 6), a target aspect angle of 0 corresponds to a broadside position of the vehicle, with the target aspect angle increasing as the vehicle rotates in a counter-clockwise fashion according to the right-hand rule. The RRP-ROM matrix 500 illustrated in FIG. 5 utilizes a heat map type representation to further help the reader visualize the data that is indexed within the matrix. It should be understood, however, that an RRP-ROM matrix generated by the systems and methods described herein may be in other forms, such as a look-up table of radar returns indexed by range bins on one axis and target aspect angles on another axis.

The example RRP-ROM matrix 500 shown in FIG. 5 is based on a radar system simulation of a pickup truck (5.8 m×2.25m) on a road surface at a target reference distance (Rtgt) of 30 m. The radar model used to generate the illustrated RRP-ROM matrix 500 utilizes a radar waveform having a 350 MHz bandwidth and providing a range resolution of 0.43 m. FIG. 6 illustrates an example of how the resultant RRP-ROM matrix may vary by changing the parameters of the radar model.

FIG. 6 shows an example RRP-ROM matrix 600 that is generated from the same target vehicle environment as used to generate the example in FIG. 5. In this example, however, the radar model used for the simulation is varied by lowering the bandwidth of the radar waveform to 100 MHZ, resulting in a range resolution of 1.5 m. Comparing FIGS. 5 and 6, it can be seen that modifications to the parameters of the simulation model can significantly affect the accuracy, quality and resolution of the resultant RRP-ROM matrix. Embodiments of the disclosed system and method therefore enable user modification and refinement of one or more of the various parameters that are used to create the simulation model, for example as shown in FIG. 7.

Figure 7:
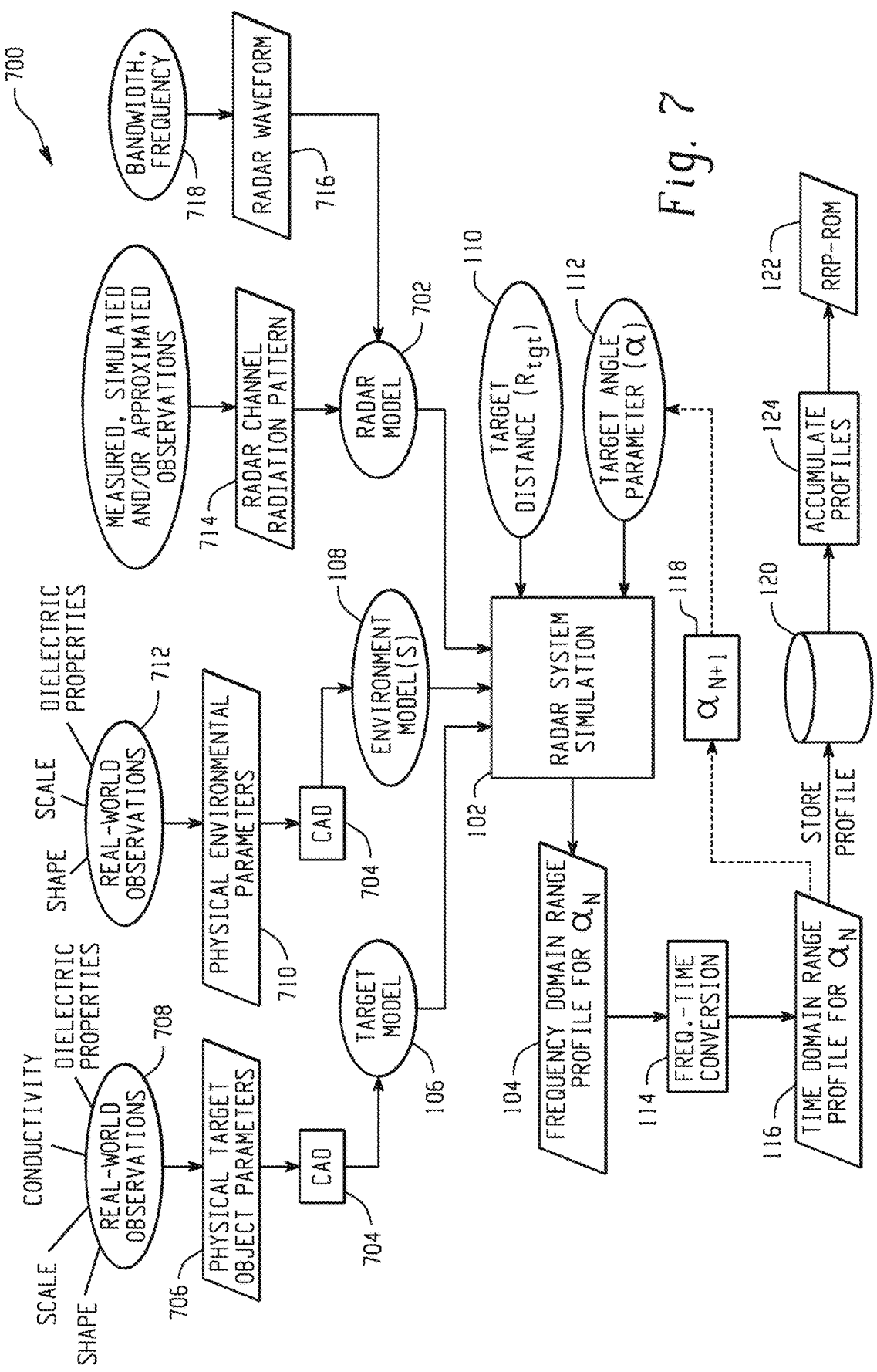
FIG. 7 is a block diagram of another example system for generating a RRP-ROM.

FIG. 7 is a block diagram illustrating another example of a system 700 for generating a RRP-ROM. Like the example system described above with reference to FIG. 1, the radar simulation module 102 in the illustrated system 700 creates a simulation model composed of a model of the radar system 702, a target simulation model 106, and an environment simulation model 108, where the target 106 is configured within the simulation model based on a prescribed target reference distance (Rtgt) 110 and target aspect angle (α) 112, such that the target 106 is positioned with its center at the prescribed reference distance (Rtgt) 110 from the radar and is rotated about its center axis of rotation by the target aspect angle (α) 112. The example system 700 shown in FIG. 7 further illustrates how the parameters and models used by the radar system simulation module 102 may be generated and/or varied to create the desired simulation model.

As illustrated, the target simulation model 106 and environment simulation model(s) 108 utilized by the radar system simulation module 102 may be created using one or more computer-aided design (CAD) tools 704. The target CAD model 106 may be created using physical parameters 706 that are based on one or more real-world observations 708 of a target object, such as an automobile, truck, bicycle, pedestrian, etc. These real-world observations 708 may include the shape (i.e., physical dimensions) of the target object, the desired scale of the model, the conductivity of the target object, and/or the target object's dielectric properties. The conductivity and/or dielectric properties of the target object may be included to take into account the target object's material composition. These properties may, for example, account for lossy materials in objects such as pedestrians. In other examples, the conductivity and/or dielectric properties may default to the characteristics of an ideal metal composition.

Similarly, the environment CAD model(s) 108 may be created using physical parameters 710 of an environment around the target that are based on one or more real-world observations 708, such as the shape (i.e., physical dimensions) of the environment object, the desired scale of the model, and/or the target object's dielectric properties. In this way, one or more environment CAD models 704 may be developed to provide a continuous cross-section of the environment in the direction of radar propagation that incorporates parameters such as the dielectric properties of environmental objects, such as a road surface, fences, guardrail structures, tunnel-walls and ceiling, curbs, etc.

In addition, parameters of the radar model 702, such as the radar channel radiation pattern 714 and radar waveform 716, may be set and/or adjusted to provide the desired radar characteristics for the simulation model. For instance, the radar waveform parameters 716 may be adjusted by modifying the waveform frequency and/or bandwidth 718. The characteristics of the radar channel radiation pattern 714 may, for example, be measured, simulated, or approximated 720 based upon the radar manufacturer's specification of radar cone coverage. These parameters 720 may, for example, be used to achieve a pattern covering the full sphere surrounding the radar, which is desirable in order to capture sidelobe effects from the extended environment.

As detailed above with reference to FIG. 1, the resultant simulation model is used by the radar system simulation module 102 to generate a frequency domain range profile 104, which is converted into a time domain range profile 116 by a frequency-to-time conversion module 114 and stored to a memory 120 for accumulation 124 into a RRP-ROM matrix 122. As detailed above, the RRP-ROM matrix 122 is created by varying (118) the target aspect angle ($\alpha$) 112 in discrete increments to generate a 360° range of target profiles.

Figure 8:
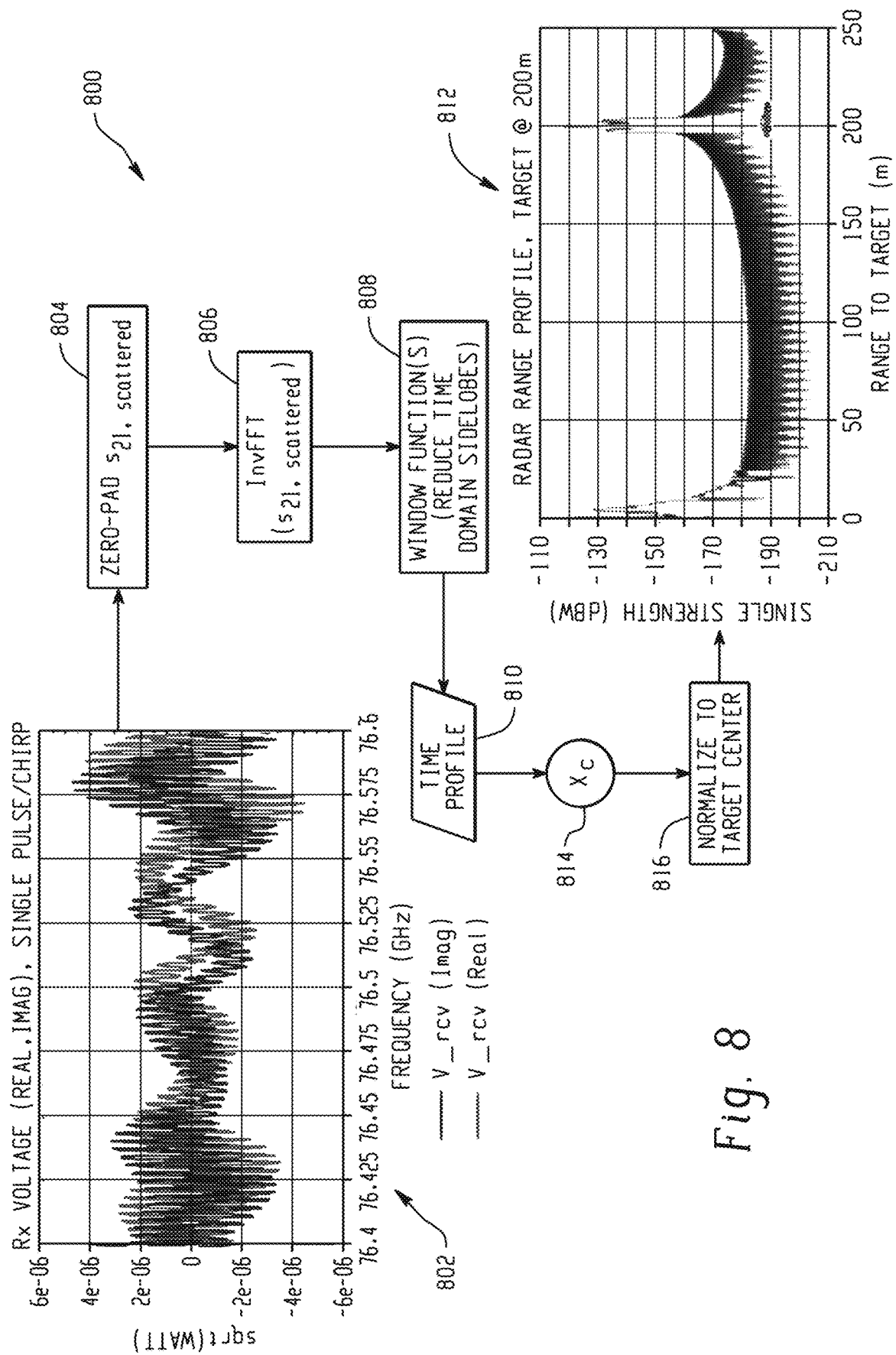
FIG. 8 is a flow diagram illustrating an example method for converting a frequency domain range profile into a time domain range profile.

FIG. 8 is a flow diagram illustrating an example method 800 for converting a frequency domain range profile into a time domain range profile. The method 800 illustrated in FIG. 8 may, for example, be utilized in the frequency-to-time conversion module 114 shown in FIGS. 1 and 7. The method 800 begins with the time domain range profile 802 which, as explained above, may include scattered S-parameter ($S_{scattered}$) data extracted using a swept-frequency analysis of the results of a SBR radar-target-environment interaction simulation. At 804, the frequency data 802 may be zero-padded in order to reach a convenient power-of-two sample size for use in Fast-Fourier Transforms (FFT) and inverse Fast-Fourier transforms, and to provide additional definition to the time domain range profile. An inverse Fast-Fourier Transform (invFFT) is applied at 806 to convert the data into the time domain. One or more time domain filtering window functions, such as a Rectangular, Hamming, Hann, Blackman-Harris, or other popular windowing function may be applied at 808 to further help reduce time domain sidelobes.

The result of steps 804, 806 and 808 is a radar time profile 810, which represents the radar waveform echo from the environment as observed at the terminals of the receive antenna (in square-root voltage complex samples.) The time-domain range profile 812 is created by multiplying the radar time profile 810 by the speed of light at 814, and normalizing the range distance to the center of the target body at 816. The range distance may be normalized to the center of the target body by subtracting the prescribed target reference distance ($R_{tgt}$) from the time-domain range profile 812 range values. This process 816 normalizes the time-domain range profile 812 to the center of the target body's center axis of rotation.

Figure 9:
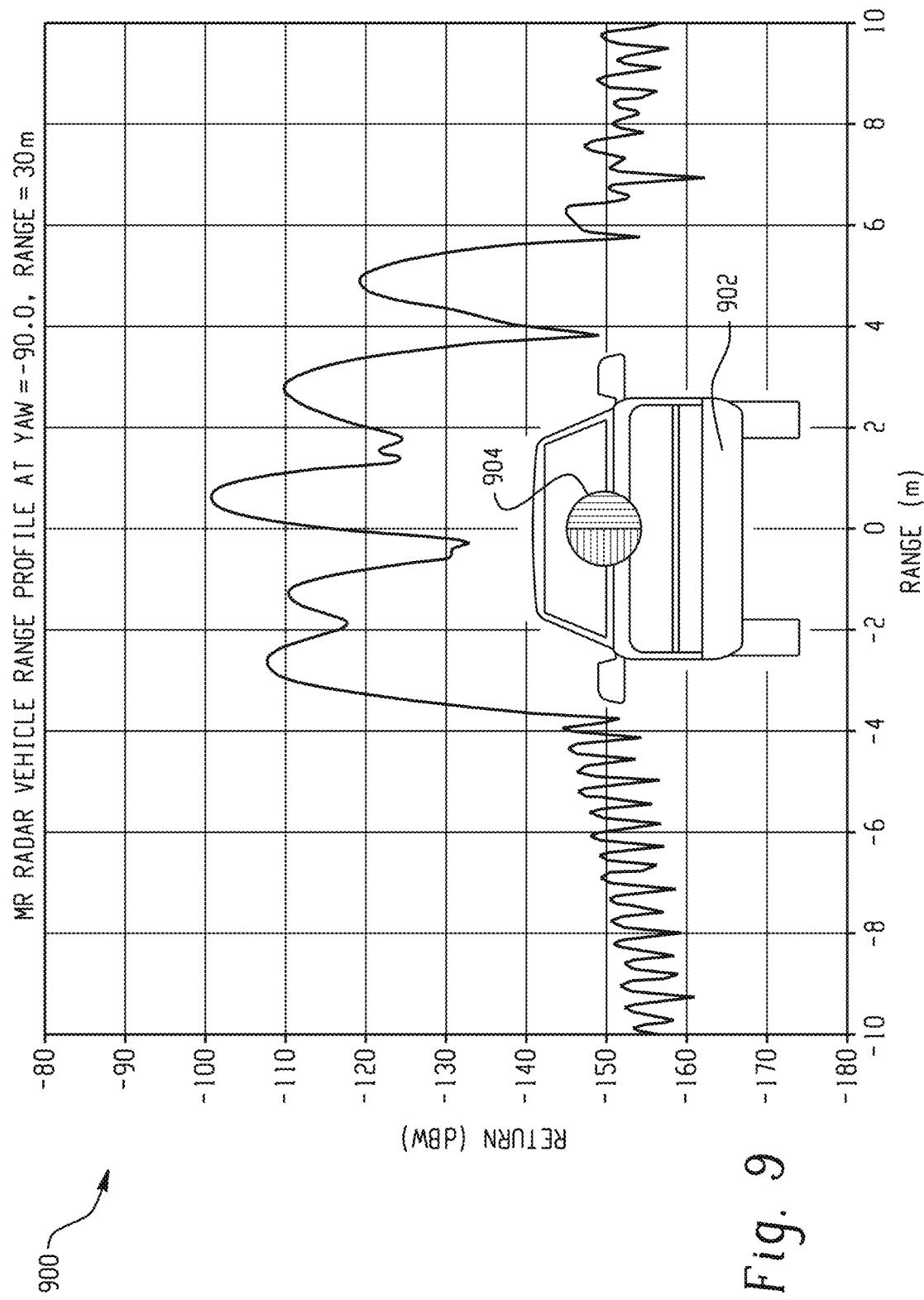
FIG. 9 is a diagram illustrating an example of a time-domain range profile in which the range distance has been normalized to the center of the target body.

FIG. 9 is a diagram illustrating an example of a time-domain range profile 900 in which the range distance has been normalized to the center of the target body. To help visualize the range distance normalization, a target vehicle 902 is superimposed over the time-domain range profile 900, and circle 904 is superimposed over the target vehicle 902 to show the location of the radar system in the foreground, facing the target vehicle 902 but at a reference distance Rtgt in front of it. The range distances indicated on the horizontal axis show radar returns about the center of the vehicle; negative distances indicate returns from uprange of the target center, and positive distances indicate returns from downrange of the target center. Uprange radar returns come from features on the target that are between the radar and the target center, and downrange radar returns come from target features that are beyond the target center. In the time-domain range profile 900 the leading return at −3 meters comes from the front of the target, and the final peak at 5 meters comes from a feature on the back end of the target. The target was originally placed at a reference distance Rtgt from the radar, the range profiles for the radar returns extracted, and the value of Rtgt subtracted from the range values so that the distances are expressed with origin at the target center.

Figure 10:
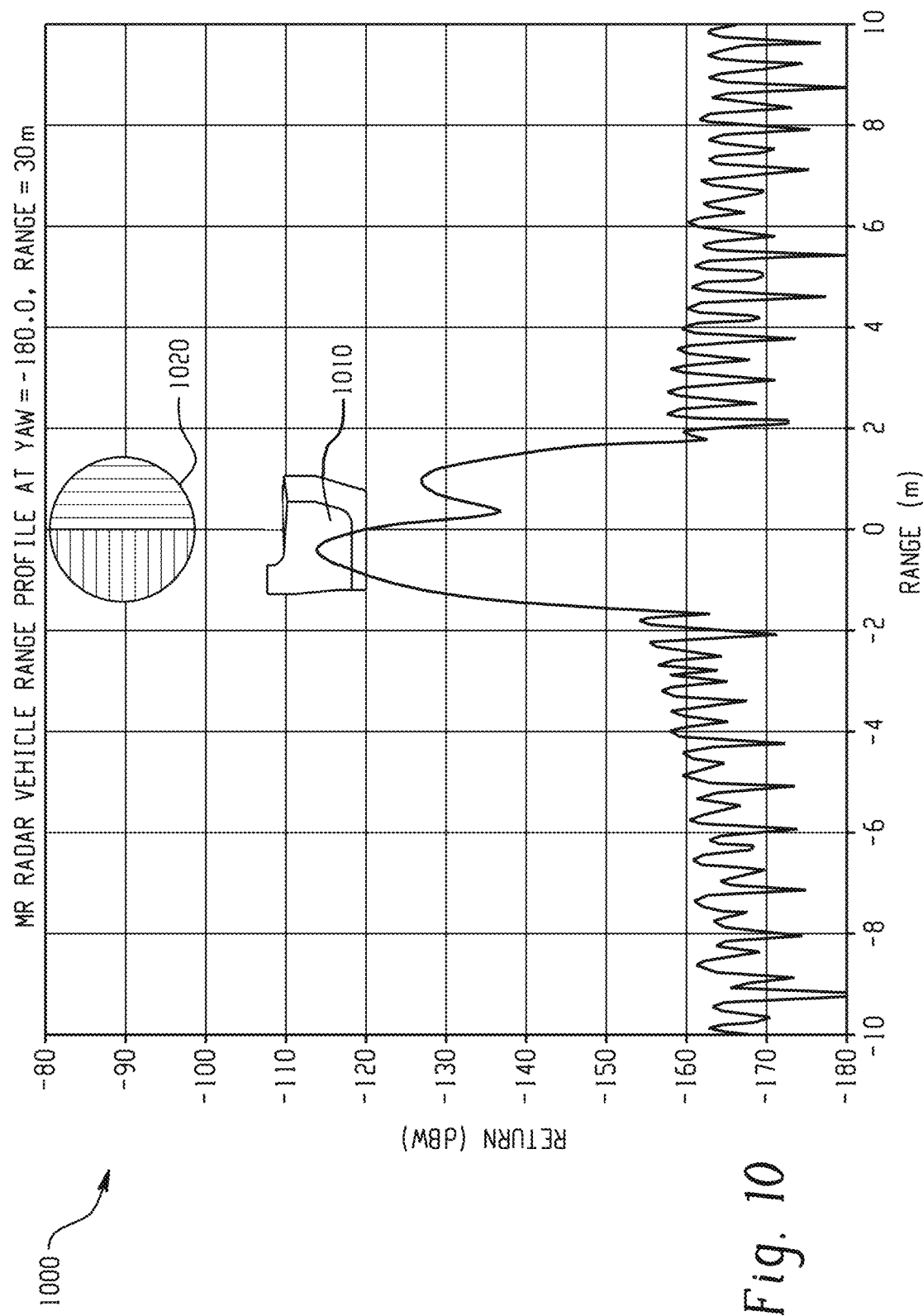
FIGS. 10-12 depict an example RRP-ROM matrix created from a portion of an object.
Figure 11:
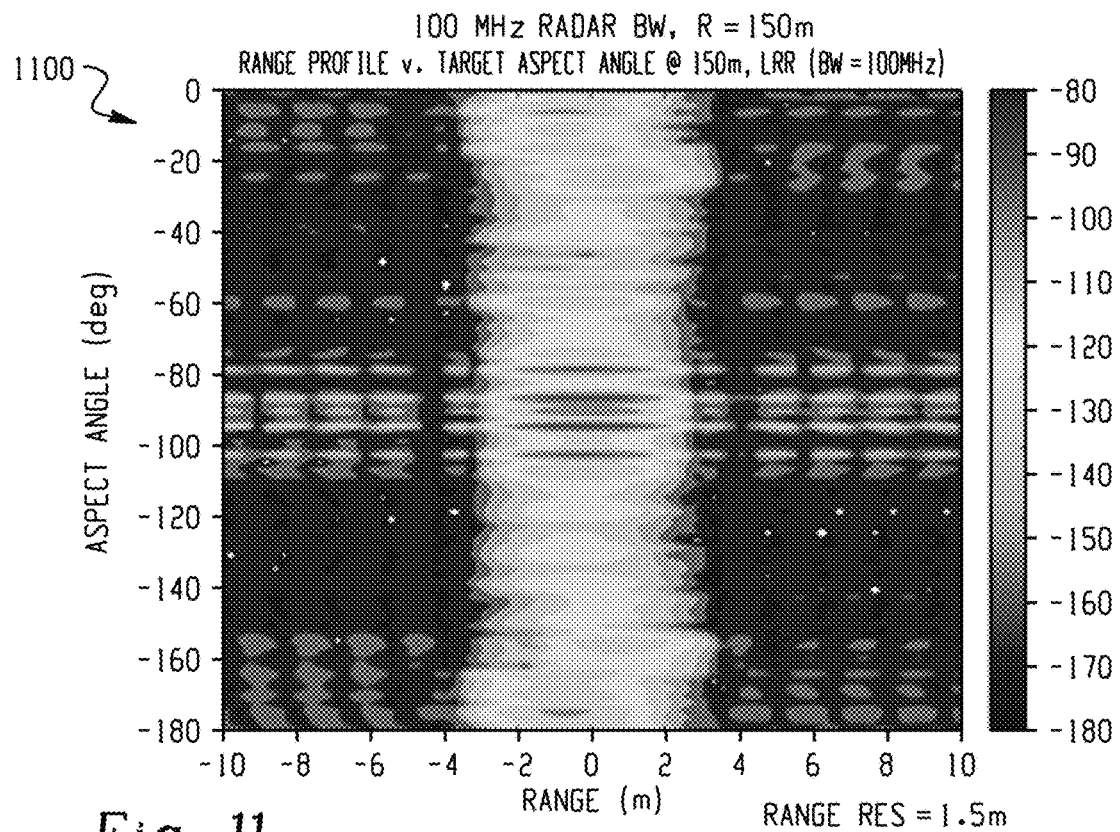
Figure 12:
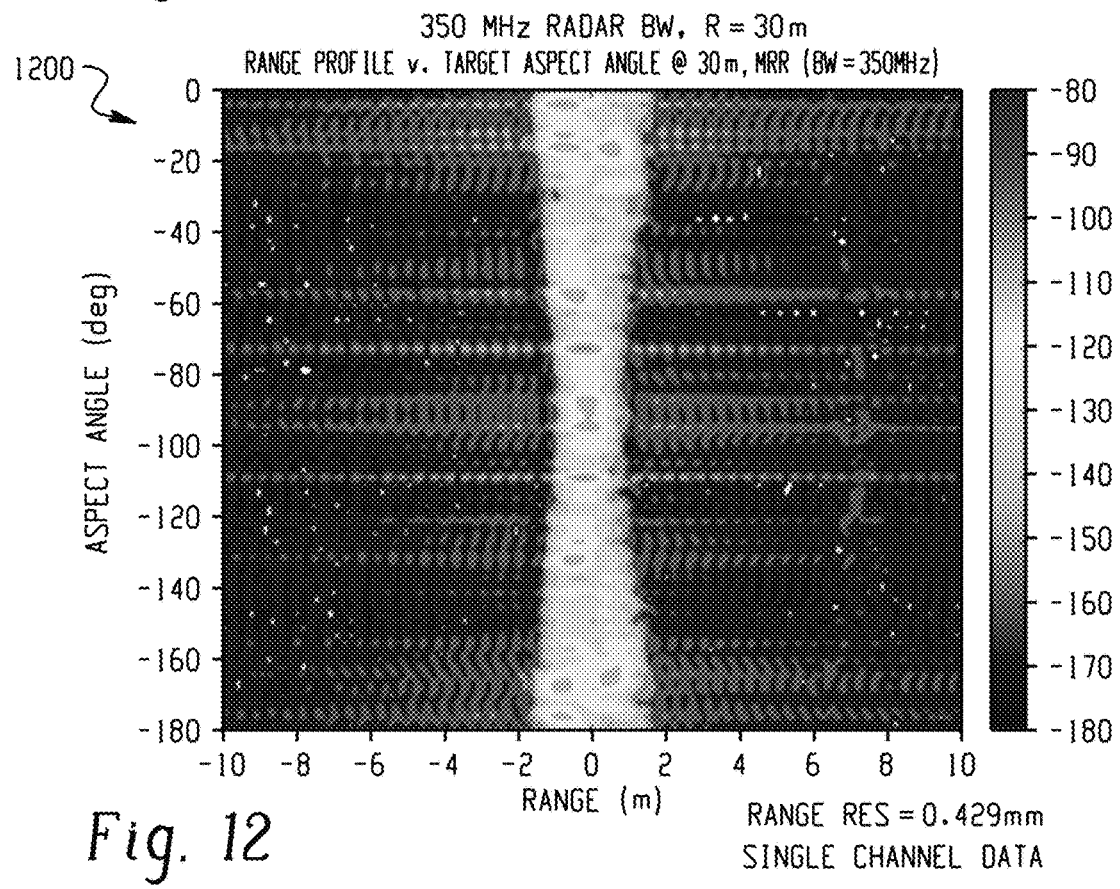

FIGS. 10-12 illustrate another example in which a RRP-ROM matrix is created from a target consisting only of a vehicle bumper. The example shown in FIGS. 10-12 may, for example, be created using the systems described above with reference to FIGS. 1 and 7, and illustrates that the systems and methods described herein may also be utilized to create range profiles for portions of an object, such as a vehicle bumper.

FIG. 10 shows an example of a time-domain range profile 1000 for a vehicle bumper 1010. The illustrated range profile 1000 may, for example, be generated by modifying the target simulation model 106 shown in FIGS. 1 and 7 to include only a portion of the target vehicle (e.g., the bumper.) As shown, the target center may still be calculated relative to radar position 1020 based on one or more dimensions of the entire object so that the target object portion 1010 better reflects its position within a real-world environment. For example, in the illustrated example, the radar 1020 is positioned in front of the target object 1010 at a reference distance of Rtgt at the appropriate height for the radar system above a road environment to take into consideration the height dimension of the entire vehicle.

FIGS. 11 and 12 illustrate examples of a RRP-ROM matrix generated from the target object portion 1010 shown in FIG. 10. Specifically, FIG. 11 is an example RRP-ROM matrix 1100 generated using the systems and methods described herein at a target reference distance (Rtgt) of 150 m, and utilizing a radar waveform having a 100 MHz bandwidth and providing a range resolution of 1.5 m. FIG. 12 is an example RRP-ROM matrix 1200 generated using the systems and methods described herein at a target reference distance (Rtgt) of 30 m and utilizing a radar waveform having a 350 MHz bandwidth and providing a range resolution of 0.429 mm.

Like the example described above with reference to FIG. 5, the illustrated RRP-ROM matrices 1100, 1200 show the radar return strengths (dBW) from the target in the form of a heat map on a graph, where the y-axis of the graph represents the target aspect angle ($\alpha$), the x-axis represents the range margin from the target center, and the radar return strength is represented on the graph by a graduated heat index (e.g., by a color gradient). It should be understood, however, that an RRP-ROM matrix generated by the systems and methods described herein may be in other forms, such as a look-up table of radar returns indexed by range bins on one axis and target aspect angles on another axis.

Using the systems and methods described herein, RRP-ROM models may be captured and resampled to enable simulation of automotive radar systems with multiple radar types, and to enable very fast radar system simulation scenarios involving high-fidelity target simulation models that are based upon full-physics modeling. As described above, RRP-ROM matrices generated by the disclosed systems and methods may provide range profiles of the subject target at various aspect angles to the radar source, which include radar signature effects of the environment. These RRP-ROM matrices may, for example, be used in subsequent radar scene simulations involving multiple such targets. Examples illustrating the use of RRP matrices for multiple target radar sensor simulations are shown in FIGS. 13 and 14, and an example system for generating multiple target radar sensor simulations is illustrated in FIG. 15.

Figure 13:
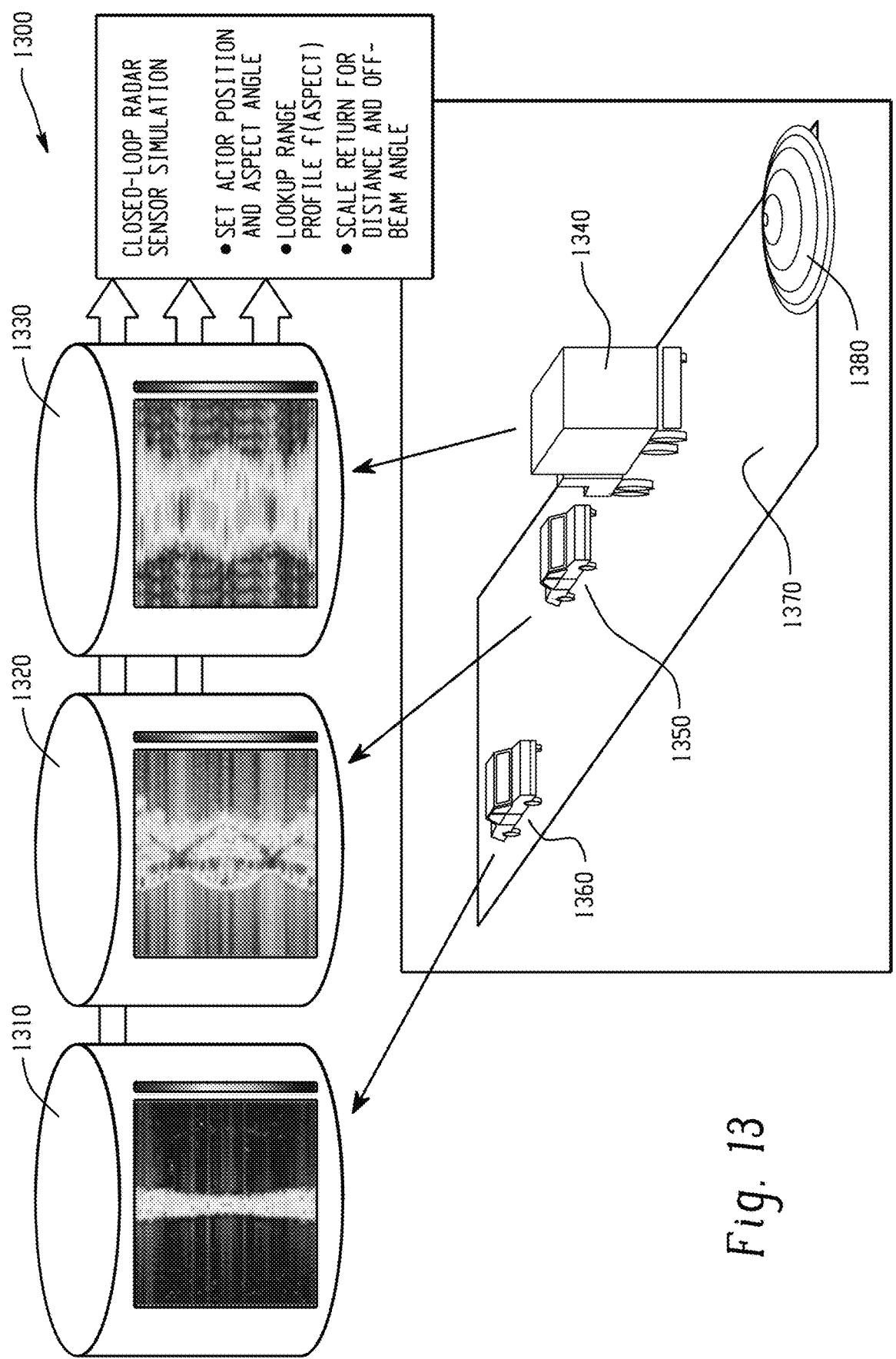
FIGS. 13 and 14 depict examples illustrating the use of RRP-ROM matrices for multiple target radar sensor simulations.

FIG. 13 illustrates an example 1300 in which three pre-generated RRP-ROM matrices 1310, 1320, 1330 are used in a closed-loop radar sensor simulation. The three pre-generated RRP-ROM matrices 1310, 1320, 1330 may, for example, be generated using the systems described above with reference to FIGS. 1 and 7 for three different objects within the environment. Specifically, in the illustrated example, RRP-ROM matrices are generated for a truck 1340 and two automobiles 1350, 1360 on a road surface environment 1370, each providing radar return strengths from a common radar system 1380. To perform the closed-loop radar sensor simulation, the target vehicles 1340, 1350, 1360 are positioned within the simulation environment at desired distances and offsets from the radar system 1380. The pre-generated RRP-ROM matrices 1310, 1320, 1330 may then be used to provide radar return values for each of the target objects 1340, 1350, 1360, for example using a simple lookup table operation based on the target aspect angle (α) of the target object within the closed-loop simulation environment. The resultant radar return value for each target object may then be scaled for range and location within the antenna radiation patterns to account for the target object's position within the closed-loop simulation environment.

A radar return value from an RRP-ROM matrix may, for example, be scaled for range by multiplying the radar return value by a scaling factor that reflects the difference between the target range (Rtgt) used to create the RRP-ROM matrix and the target range within the closed-loop simulation. One or more target return values in the closed-loop simulation may also be scaled to account for any necessary gain variations due, for example, to the target being off-beam in the transmit or receive radiation pattern (e.g., such as target 1360 in the illustrated example).

Figure 14:
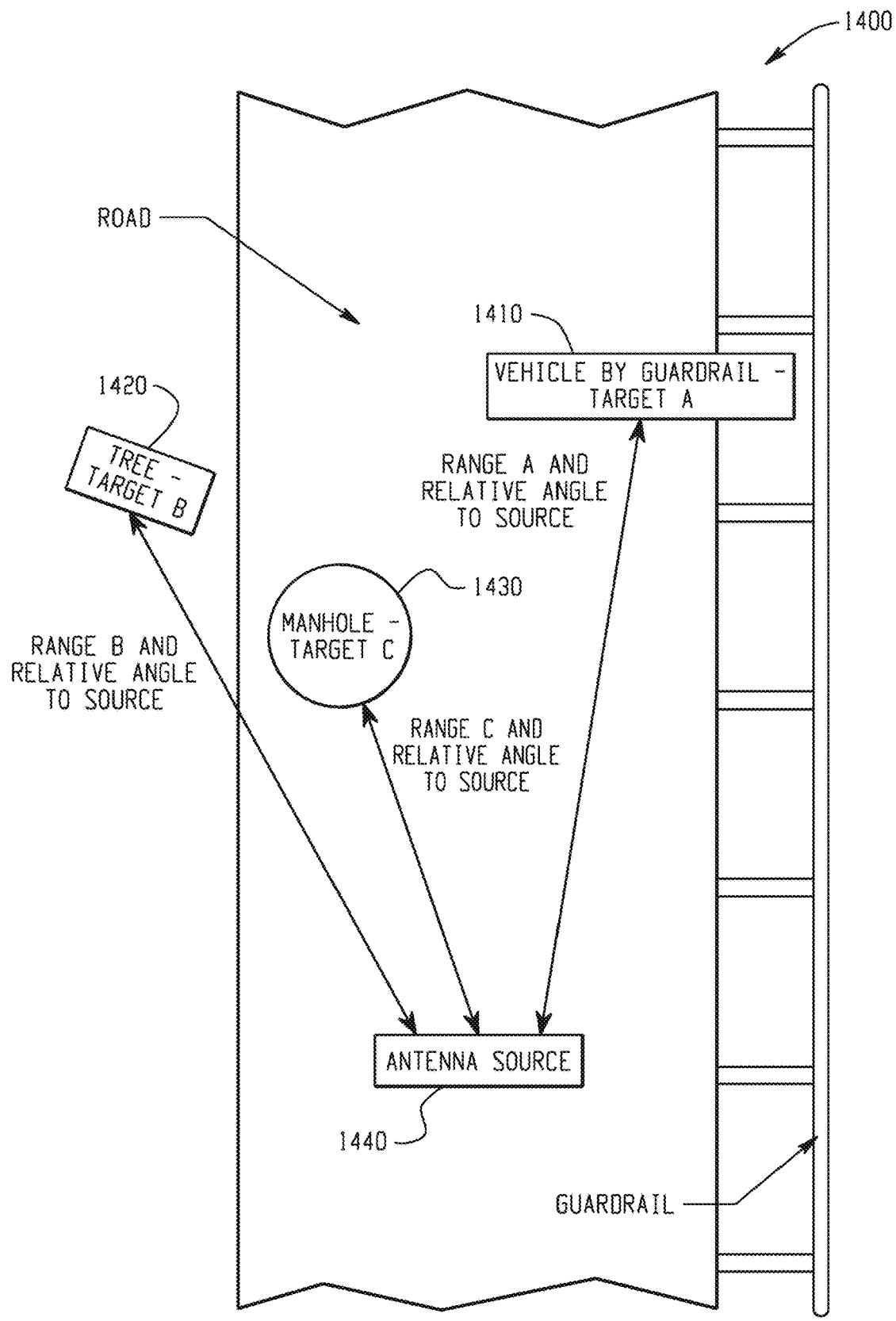
Figure 15:
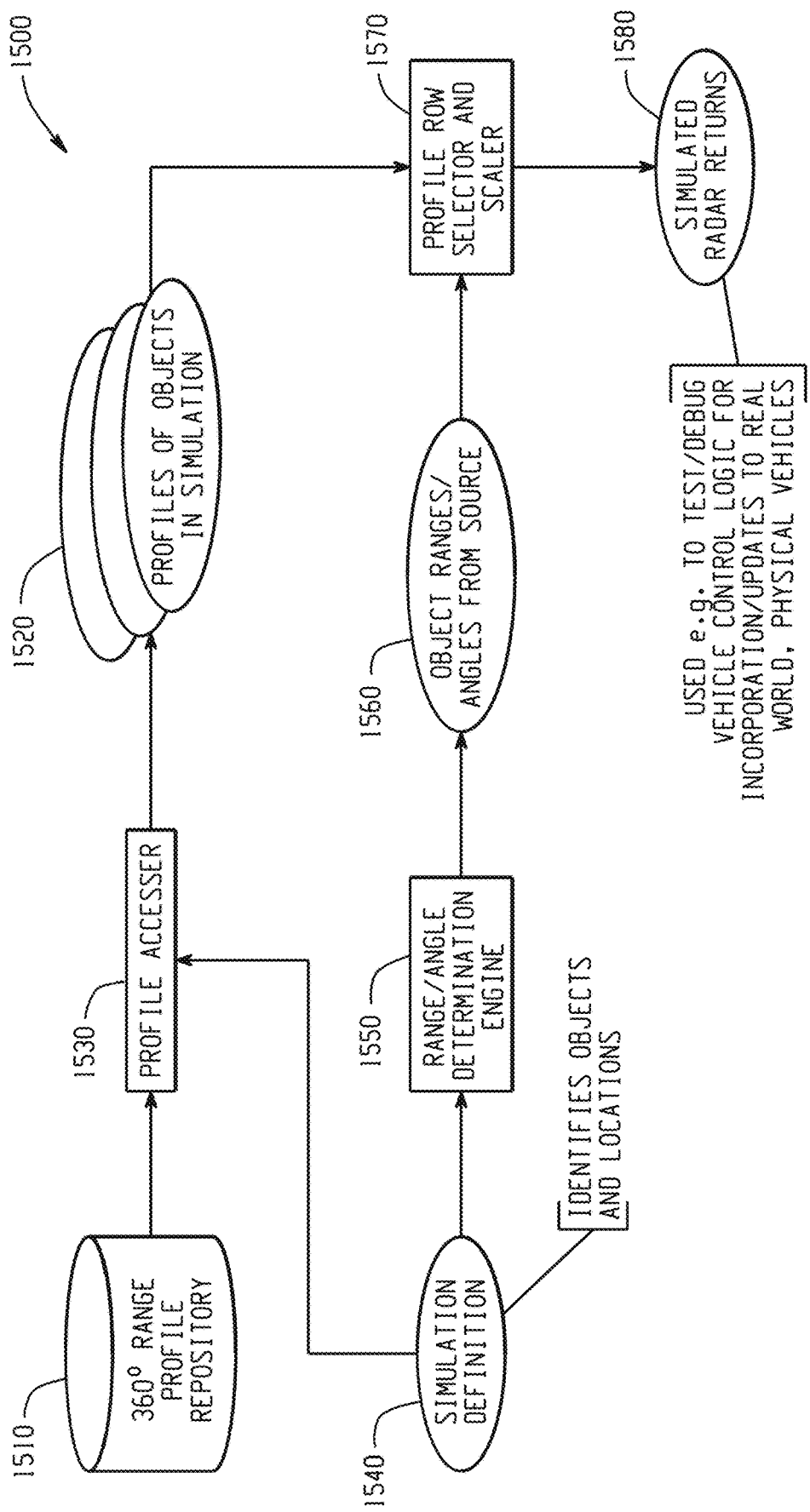
FIG. 15 depicts an example system for generating multiple target radar sensor simulations.

FIG. 14 illustrates another example 1400 of how multiple pre-generated RRP-ROM matrices may be used in a closed-loop radar sensor simulation. In this example RRP-ROM matrices (not shown) have been pre-generated for three different target objects 1410, 1420, 1430, for example using the systems described above with reference to FIGS. 1 and 7. Specifically, a first RRP-ROM matrix has been pre-generated for Target A 1410 comprising a vehicle in an environment that includes a road surface and an adjacent guardrail. A second RRP-ROM matrix has been pre-generated for Target B 1420 comprising a tree in an environment that includes a road surface adjacent to the tree. A third RRP-ROM matrix has been generated for Target C 1430 for a manhole cover in an environment that includes a road surface surrounding the manhole cover.

As illustrated, a closed-loop simulation may be setup by defining the range and aspect angle (α) of each target object 1410, 1420, 1430 relative to the radar system antenna source 1440. The closed-loop simulation may then use the pre-generated RRP-ROM matrices to identify radar return values for each target object 1410, 1420, 1430 based on the target aspect angles (α), for example using a lookup-table operation. The radar return value for each target object may then be scaled for range to account for the target object's position within the closed-loop simulation environment, and may also be scaled to account for any necessary gain reduction due to the target being off-beam in the transmit or receive radiation pattern of the antenna system 1440.

FIG. 15 is a block diagram of an example system 1500 for performing a closed-loop radar sensor simulation using pre-generated RRP-ROM matrices. The system 1500 includes a range profile repository 1510 for storing a plurality of pre-generated RRP-ROM matrices. To perform the closed-loop radar sensor simulation, one or more of the pre-generated RRP-ROM matrices 1520 are retrieved from the profile repository 1510 by a profile accesser 1530 based on a simulation definition 1540. The simulation definition 1530 may, for example, identify one or more target objects for simulation and the locations of the target objects within the simulation environment.

Based on the simulation definition 1540, a range/angle determination engine 1550 may be used to determine the range and aspect angle (α) 1560 of each target object relative to the radar system antennas, for example as illustrated in FIG. 14. Using the target object aspect angles (α), a profile row selector and scaler 1570 may determine a radar return value for each target object by performing a database operation, such as a lookup table operation, using the pre-generated RRP-ROM matrix 1520 for the target object. The profile row selector and scaler 1570 may then generate simulated radar returns 1580 by scaling the radar return value for each target object, if necessary, to account for the target object's position within the closed-loop simulation environment, and also to account for any necessary gain reduction due to the target being off-beam in the transmit or receive radiation pattern of the antenna system. A composite simulated radar return can be developed by combining the returns of each of the individual targets, thus capturing a first-order radar return from a complex environment composed of multiple targets in an extended environment. The simulated radar returns may, for example, be used to test and/or debug the control logic in a vehicle control or advance driver assistance system (ADAS) for incorporation or update to systems in a real-world physical vehicle.

Figure 16:
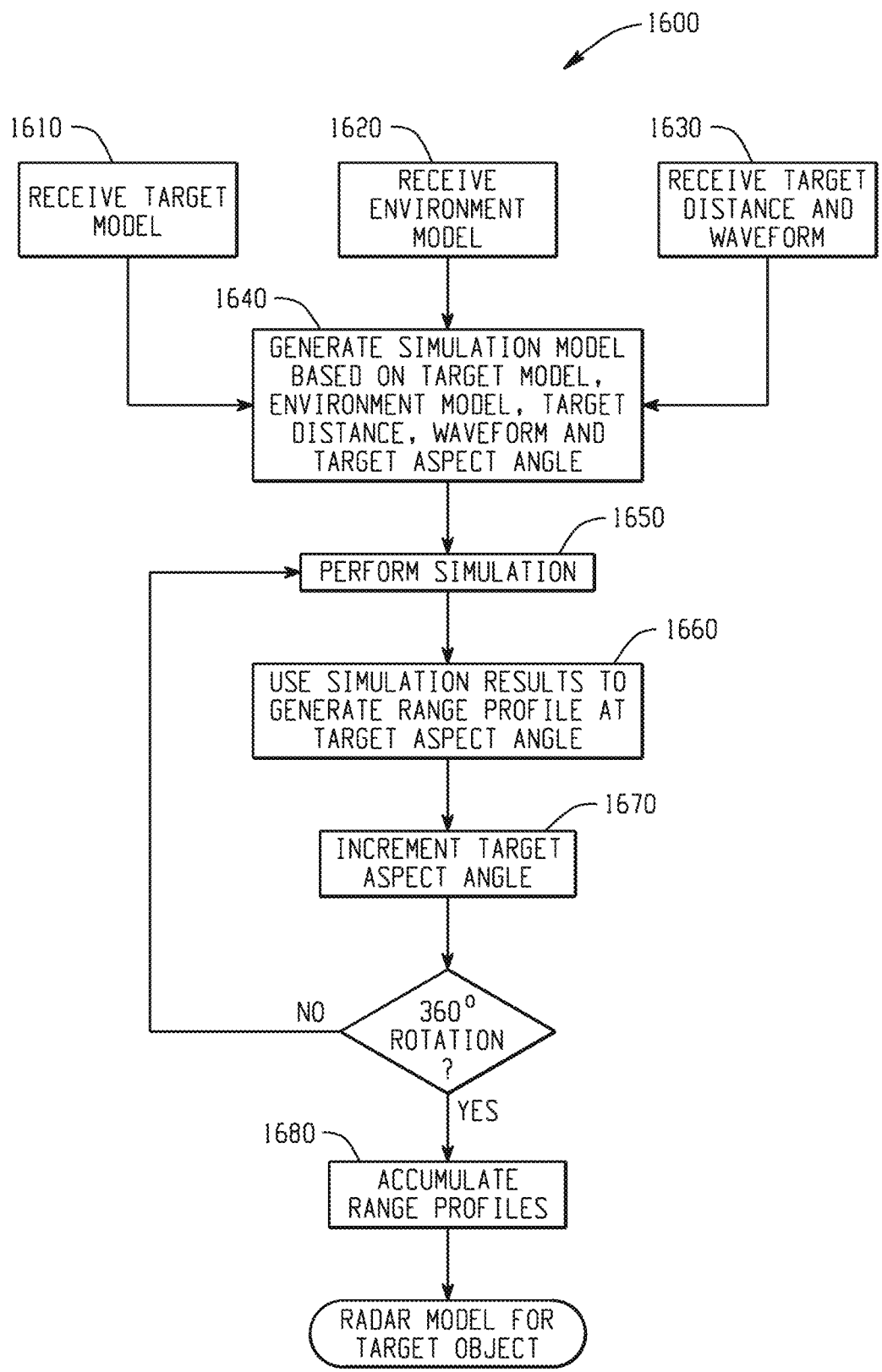
FIG. 16 is a flow diagram of an example method for generating a radar model for a target object.

FIG. 16 is a flow diagram of an example method 1600 for generating a radar model for a target object. The example method 1600 depicted in FIG. 16 may, for example, be employed by the systems shown in FIGS. 1 and 7. At 1610, a target simulation model is received that identifies one or more physical aspects of a target object. At 1620, an environment simulation model is received that identifies one or more physical aspects of an environment object. A target distance parameter is received at 1630 that identifies a reference distance between the target object and a radar system to be simulated. Also received at 1630 are the waveform characteristics of the radar system to be simulated.

At 1640, a simulation model is generated based, at least in part, on the target simulation model, the environment simulation model, the target reference distance and the waveform characteristics of the radar. The simulation model is further based on a target aspect angle that identifies an angular position of the target object in relation to the radar system. Interaction of the radar system with the target object and the environment object is then simulated at 1650 using the simulation model. The simulation is used at 1660 to generate a range profile for the target object at the target aspect angle, wherein the range profile identifies a radar return strength for the target distance.

The target aspect angle is incremented at 1670, and operations 1650-1660 are repeated until range profiles are generated for the target object at a plurality of target angles amounting to a 360 degree rotation of the target object. The range profiles at the plurality of target angles are accumulated at 1680 to generate the radar model for the target object.

It should be understood that the method 1600 shown in FIG. 16 may be repeated for different combinations of radar systems (e.g., different radar waveform characteristics) and targets that a user may wish to simulate.

Figure 17:
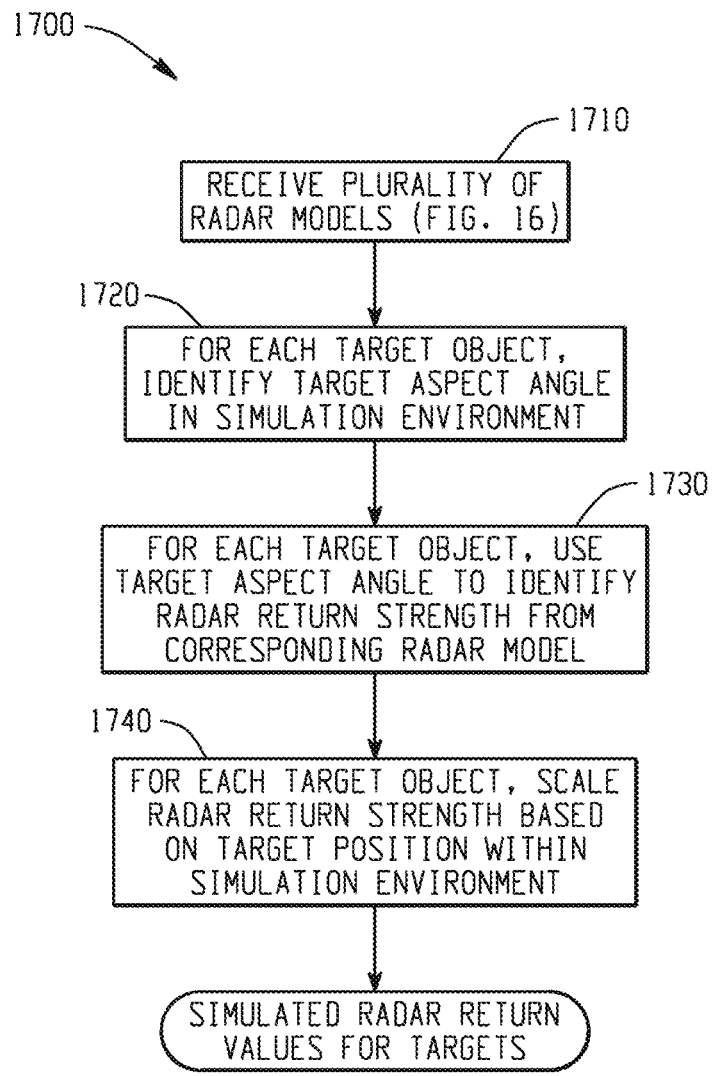
FIG. 17 is a flow diagram of an example method of performing a closed-loop radar sensor simulation.

FIG. 17 is a flow diagram illustrating an example method of performing a closed-loop radar sensor simulation. At 1710, a plurality of radar models are received for target objects within a simulation environment. The plurality of radar models may be generated using the method of set forth in FIG. 16. At 1720, for each target object within the simulation environment, a target aspect angle is identified relative to a radar sensor within the simulation environment. At 1730, for each target object within the simulation environment, the target aspect angle is used to identify a corresponding radar return strength from the radar model for the target object. At 1740, for each target object within the simulation environment, the radar return strength is scaled based on a position of the target object within the simulation environment relative to the radar sensor to generate a simulated radar return value.

Figure 18:
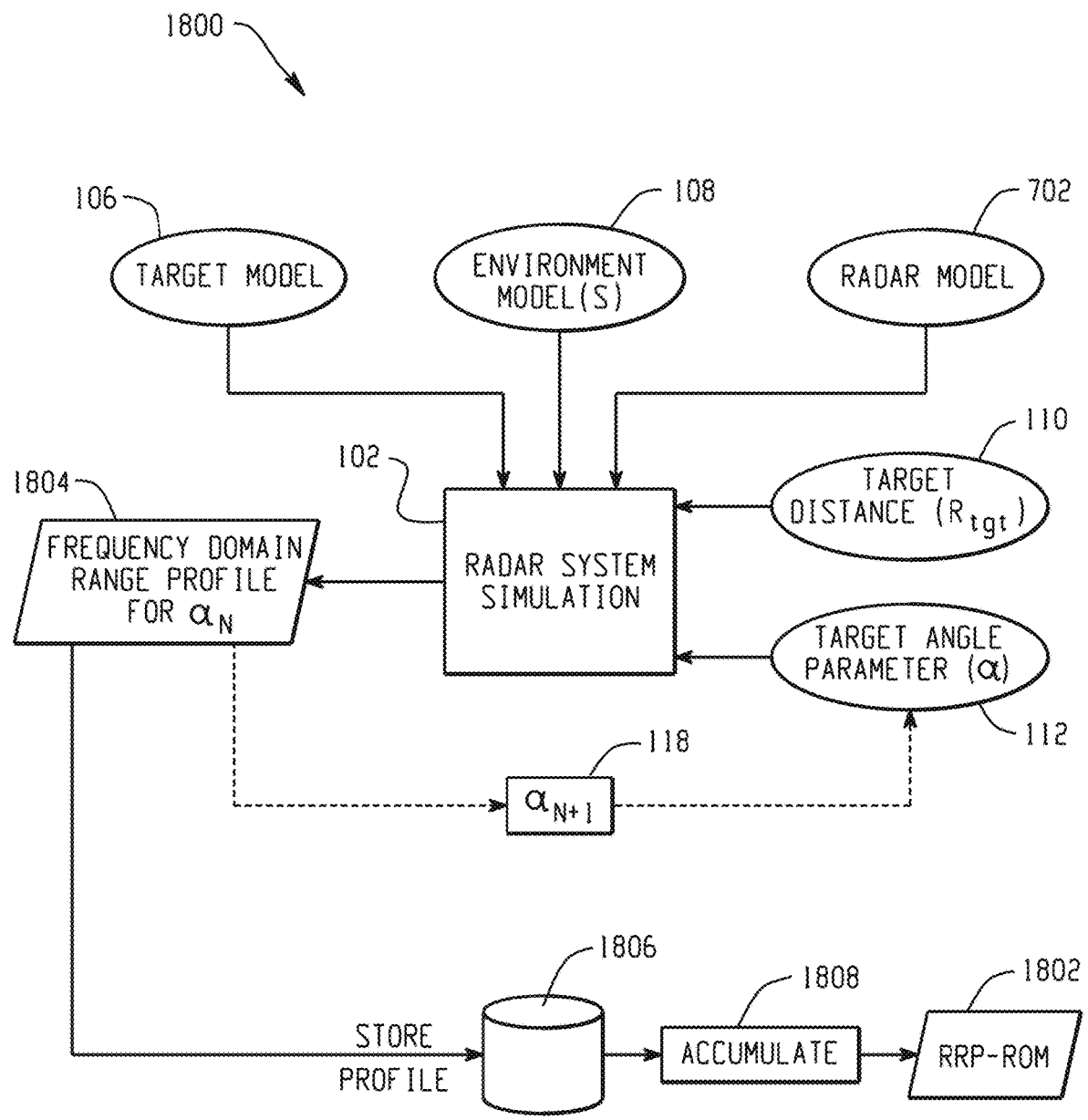
FIGS. 18 and 19 are block diagrams depicting additional examples of systems for generating a RRP-ROM.

FIG. 18 is a block diagram depicting an additional example of system 1800 for generating a RRP-ROM 1802. The example system 1800 illustrated in FIG. 18 is similar to the example systems shown in FIGS. 1 and 7, except that the ROM models are kept in the frequency domain.

Like the example systems described above with reference to FIGS. 1 and 7, the radar simulation module 102 in the illustrated system 1800 creates a simulation model composed of a model of the radar system 702, a target simulation model 106, and an environment simulation model 108, where the target 106 is configured within the simulation model based on a prescribed target reference distance (Rtgt) 110 and target aspect angle (α) 112, such that the target 106 is positioned with its center at the prescribed reference distance (Rtgt) 110 from the radar and is rotated about its center axis of rotation by the target aspect angle (α) 112. The parameters and models used by the radar system simulation module 102 may, for example, be generated and/or varied to create the desired simulation model in the same way as described above with reference to FIG. 7.

As detailed above with reference to FIGS. 1 and 2, the resultant simulation model is used by the radar system simulation module 102 to generate a frequency domain range profile 1804. For instance, an SBR antenna-to-antenna coupling simulation may be used to yield scattering parameter (S-parameter) data representing the coupling between the transmit and receive antennas, which is separated into incident field parameters (coupling with no scattering geometry) and scattered field parameters (coupling due to currents stimulated on the target and environment.) The scattered S-parameters are extracted using a swept-frequency analysis, and are stored in memory 1806 with reference to the prescribed target aspect angle (α) and reference distance (Rtgt). The target aspect angle (α) is then incremented by the target aspect angle incrementation module 118, and the simulation process is repeated for the new target aspect angle (α) 112. Simulation continues until frequency domain range profiles 1804 have been generated and stored to memory 1806 for each aspect angle (α) within a 360° rotation of the target. The stored frequency domain simulation data (e.g., a table of complex frequency samples vs. target aspect angles) is then exported by accumulation module 1808 to generate the RRP-ROM 1802.

Figure 19:
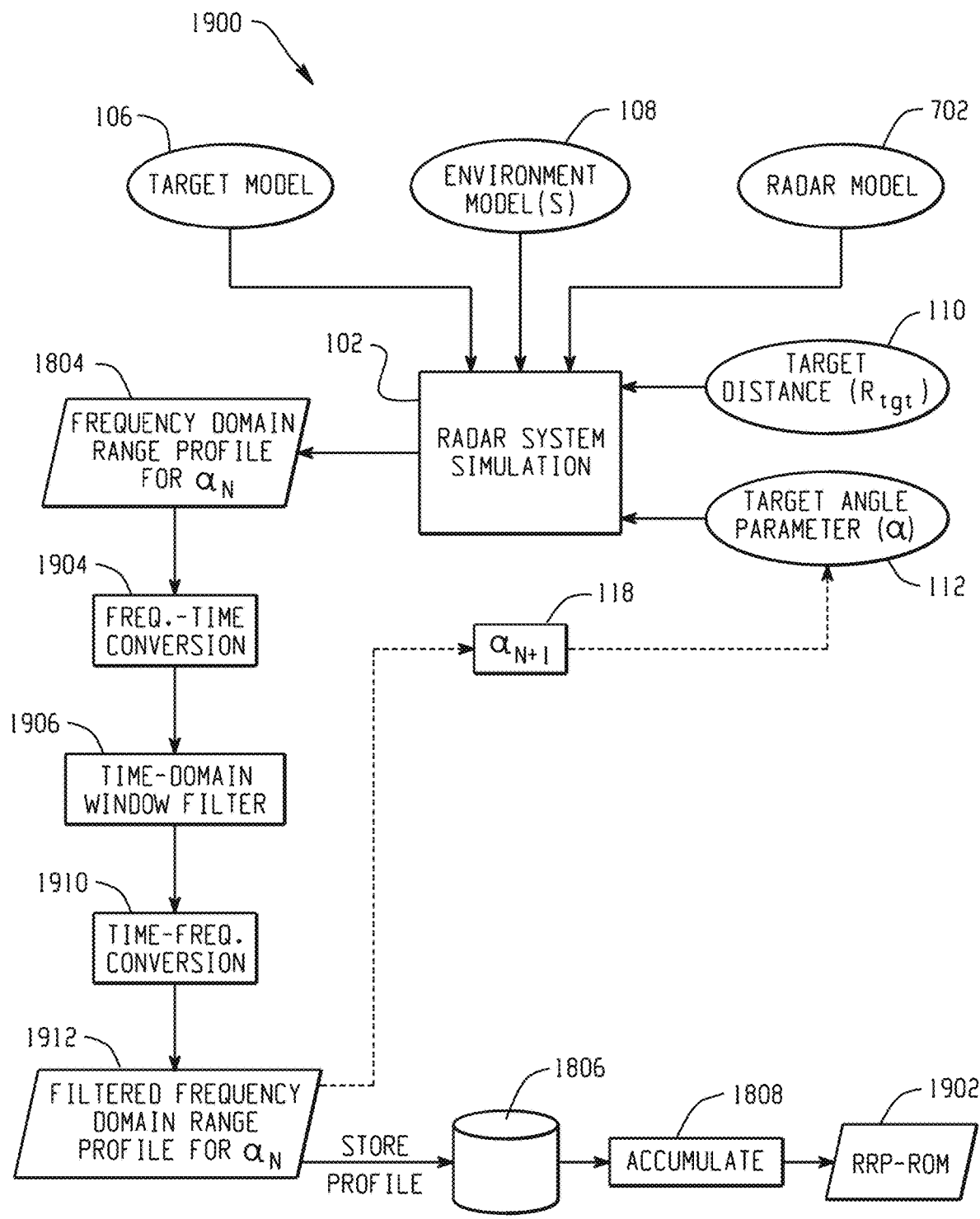

FIG. 19 is a block diagram illustrating another example of a system 1900 for generating a RRP-ROM 1902. The example illustrated in FIG. 19 is similar to FIG. 18, except that the frequency domain range profile 1804 is converted to the time domain for filtering and then converted back into the frequency domain for storage and RRP-ROM creation.

The radar simulation module 102 in the illustrated system 1900 creates a simulation model, for example as described above with reference to FIGS. 1 and 7, and the resultant simulation model is used by the radar system simulation module 102 to generate a frequency domain range profile 1804. The frequency domain range profile 1804 is converted into the time domain by a frequency-to-time conversion module 1904, for example using an inverse Fast-Fourier Transform (FFT) as described above with reference to FIG. 1. A time domain windowing filter 1906 is then applied to the time domain range profile. The time domain windowing filter 1906 may, for example, utilize one or more time domain filtering window functions, such as a Rectangular, Hamming, Hann, Blackman-Harris, or other windowing function. The filtered time domain profile is then converted back into the frequency domain by a time-to-frequency conversion module 1910 to generate a filtered frequency domain range profile 1912, which is stored in memory 1806.

The target aspect angle (α) is then incremented by the target aspect angle incrementation module 118, and the simulation process is repeated for the new target aspect angle (α) 112. Simulation continues until filtered frequency domain range profiles 1912 have been generated and stored to memory 1806 for each aspect angle (α) within a 360° rotation of the target. The stored filtered frequency domain simulation data (e.g., a table of complex frequency samples vs. target aspect angles) is then exported by accumulation module 1808 to generate the RRP-ROM 1902.

Figure 20:
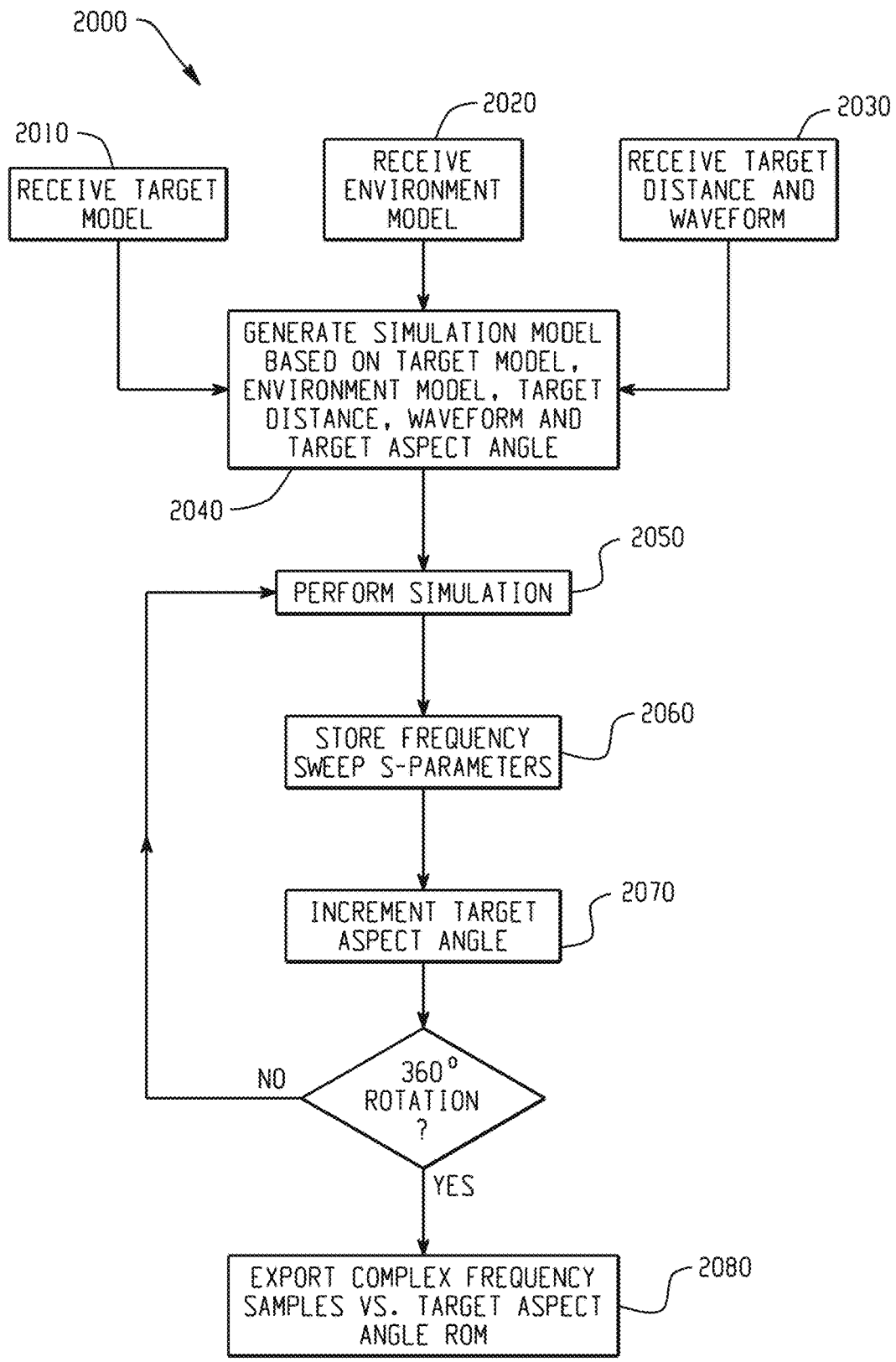
FIGS. 20 and 21 are flow diagrams depicting additional examples of methods for generating a RRP-ROM.

FIG. 20 is a flow diagram of an example method 2000 for generating a radar model for a target object. The example method 2000 depicted in FIG. 20 may, for example, be employed by the system shown in FIG. 18. At 2010, a target simulation model is received that identifies one or more physical aspects of a target object. At 2020, an environment simulation model is received that identifies one or more physical aspects of an environment object. A target distance parameter is received at 2030 that identifies a reference distance between the target object and a radar system to be simulated. Also received at 2030 are the waveform characteristics of the radar system to be simulated.

At 2040, a simulation model is generated based, at least in part, on the target simulation model, the environment simulation model, the target reference distance and the waveform characteristics of the radar. The simulation model is further based on a target aspect angle that identifies an angular position of the target object in relation to the radar system. Interaction of the radar system with the target object and the environment object is then simulated at 2050 using the simulation model. The simulation is used at 2060 to generate and store a frequency-domain range profile for the target object at the target aspect angle, wherein the stored frequency-domain range profile includes scattered S-parameters that are stored with reference to the prescribed target aspect angle (α) and reference distance (Rtgt).

The target aspect angle is incremented at 2070, and operations 2050-2060 are repeated until range profiles are generated for the target object at a plurality of target angles amounting to a 360 degree rotation of the target object. The frequency-domain range profiles at the plurality of target angles are exported at 2080 to generate the radar model for the target object.

Figure 21:
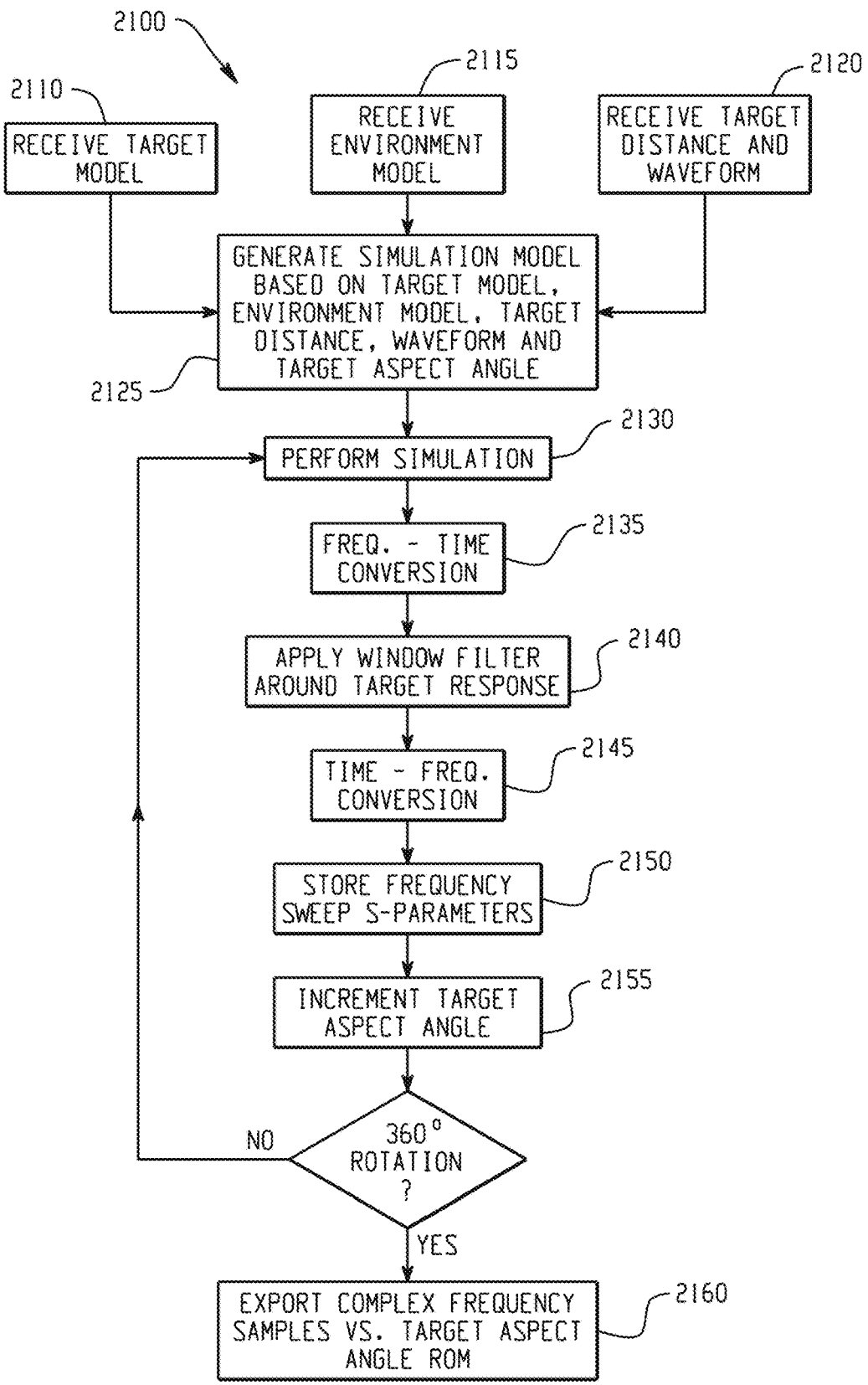

FIG. 21 is a flow diagram of another example method 2100 for generating a radar model for a target object. The example method 2100 depicted in FIG. 21 may, for example, be employed by the system shown in FIG. 19. At 2110, a target simulation model is received that identifies one or more physical aspects of a target object. At 2115, an environment simulation model is received that identifies one or more physical aspects of an environment object. A target distance parameter is received at 2120 that identifies a reference distance between the target object and a radar system to be simulated. Also received at 2120 are the waveform characteristics of the radar system to be simulated.

At 2130, a simulation model is generated based, at least in part, on the target simulation model, the environment simulation model, the target reference distance and the waveform characteristics of the radar. The simulation model is further based on a target aspect angle that identifies an angular position of the target object in relation to the radar system. Interaction of the radar system with the target object and the environment object is then simulated at 2130 using the simulation model, and the scattered S-parameters are saved as a frequency-domain range profile for the target object at the target aspect angle and reference distance (Rtgt).

The frequency-domain range profile is converted into the time domain at 2135, for example using inverse Fast-Fourier Transform (FFT) as described above with reference to FIG. 1. A time domain windowing filter is then applied to the time domain range profile at 2140, for example utilizing one or more time domain filtering window functions, such as a Rectangular, Hamming, Hann, Blackman-Harris, or other windowing function. The filtered time domain profile is then converted back into the frequency domain at 2145 to generate a filtered frequency domain range profile, which is stored in memory at 2150.

The target aspect angle is incremented at 2155, and operations 2230-2155 are repeated until range profiles are generated for the target object at a plurality of target angles amounting to a 360 degree rotation of the target object. The frequency-domain range profiles at the plurality of target angles are exported at 2160 to generate the radar model for the target object.

It should be understood that the methods 2000, 2100 shown in FIGS. 20 and 21 may be repeated for different combinations of radar systems (e.g., different radar waveform characteristics) and targets that a user may wish to simulate.

Figure 22:
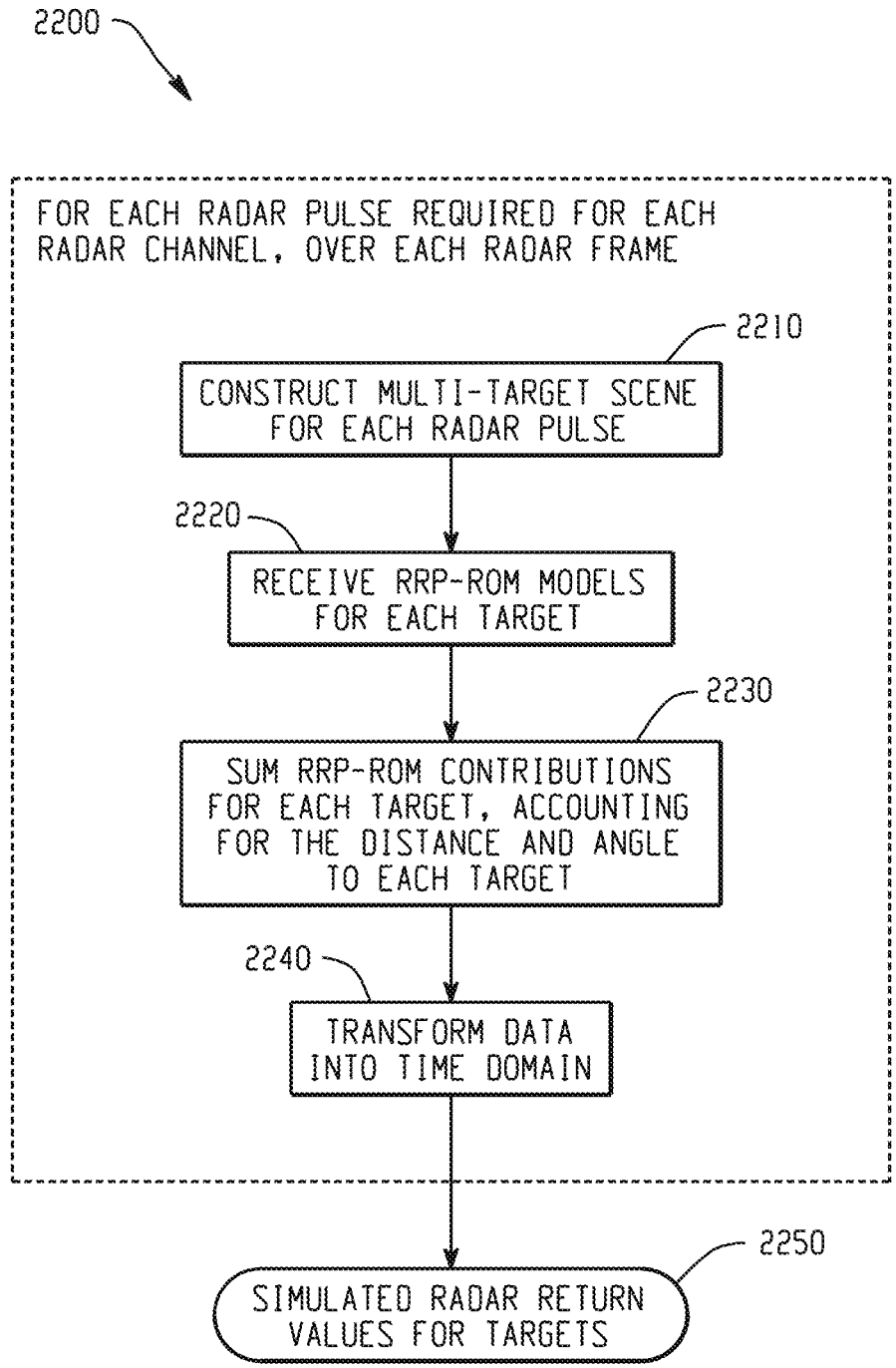
FIGS. 22-24 illustrate another example of a method for performing a closed-loop radar sensor simulation using RRP-ROMs.

FIG. 22 is a flow diagram illustrating an example method 2200 of performing a closed-loop radar sensor simulation. At 2210, a multi-target scene is constructed for a radar pulse in the closed-loop radar sensor simulation, for example as described below with reference to FIG. 23. A RRP-ROM model is then received at 2220 for each target in the multi-target scene. The RRP-ROM models received at 2220 may, for example, be generated using one or more of the systems described herein, and may be received from an input mechanism or retrieved from one or more computer-readable storage medium. At 2330 the RRP-ROM contributions for each target in the multi-target scene are summed, accounting for the distance and angle of each target. The result of step 2230 is a summation of radar signal content at each sample frequency for all of the targets in the multi-target scene. The summation data is then transformed into the time domain at 2240, for example using an inverse Fourier Transform. The result of step 2240 is a composite range profile, also known as a single pulse "fast time" response.

As illustrated by the dotted box in FIG. 22, operations 2210-2240 may be repeated to generate a simulated radar return 2250 for multiple radar pulses, channels and frames within the closed-loop radar simulation.

Figure 23:
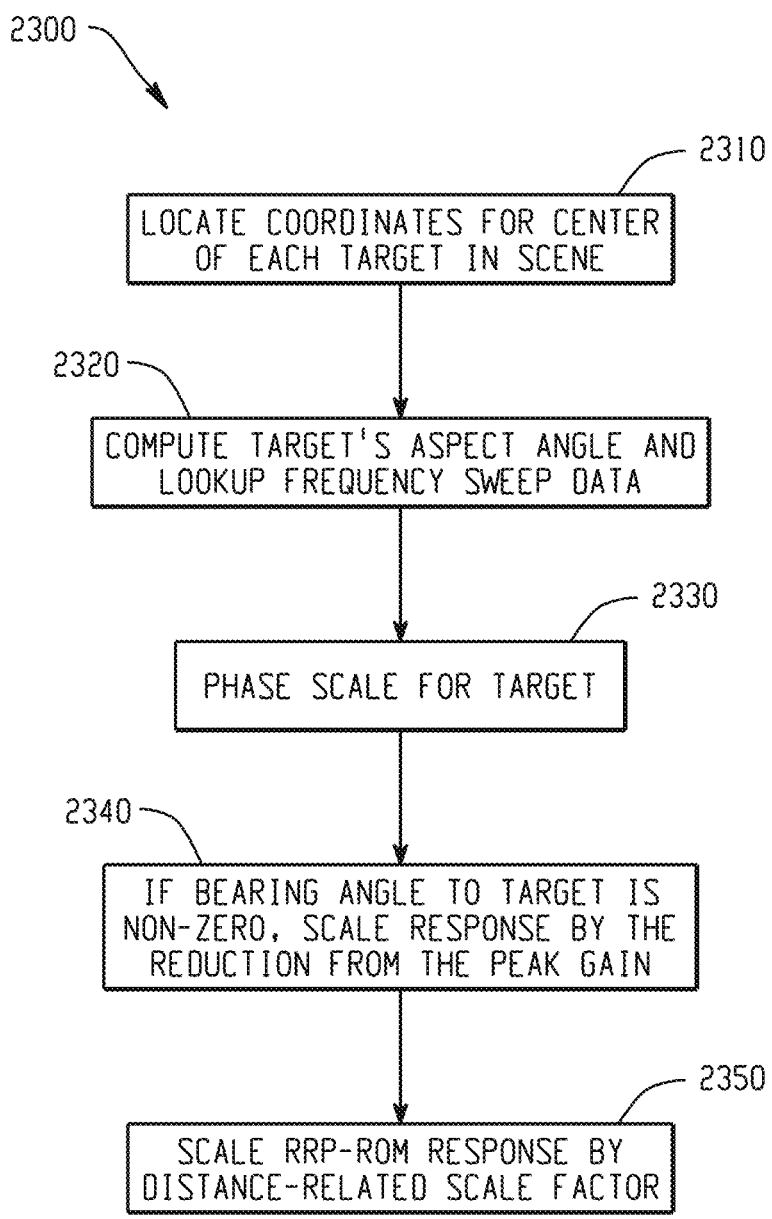

FIG. 23 is a flow diagram of an example method 2300 for generating a multi-target scene for a closed-loop radar simulation. The method 2300 may, for example, be used at step 2210 of FIG. 22 described above. The example method 2300 is described with reference to the example multi-target scene illustrated in FIG. 24.

At 2310, coordinates are located for the ground truth location of the center of each target in the scene. With reference to the example shown in FIG. 24, two targets are illustrated (Target 1 and Target 2). In the illustrated example, the ground truth location of the center of Target 1 is located at a distance $R_1$ from the radar transmitter, and the ground truth location of the center of Target 2 is located at a distance $R_2$ from the radar transmitter. With reference again to FIG. 23, at step 2320, the aspect angle is determined for each target, and the aspect angle is used to look up the associated frequency sweep data ($RRP_n(\theta)$).

At 2330, the $RRP_n(\theta)$ frequency sweep data for each target is scaled in phase to obtain the appropriate electrical distance from the target to the reference location for the RRP ROM. Phase scaling may be accomplished by multiplying a factor of $e^{j2k(R_{REF}-\|R_1\|)}$, where k is the wave number $$\left(\frac{2\pi}{\lambda}\right)$$

at the center frequency, $R_1$ is a vector from the radar origin to the target RRP ROM origin, and $R_{REF}$ is the reference distance for the RRP ROM. The factor of 2 accounts for round-trip phase distance. Phase is added (positive) when $R_{REF}-\|R_1\|>0$, and subtracted when $R_{REF}-\|R_1\|<0$.

At 2340, if the bearing angle to the target is non-zero, the response is scaled by the reduction from peak gain at the bearing angle for the transmit radiation pattern ($\Psi t(\theta)$) and the receive radiation pattern ($\Psi r(\theta)$). Examples of the transmit radiation pattern ($\Psi t(\theta)$) and the receive radiation pattern ($\Psi r(\theta)$) for a radar transmitter are depicted in the example shown in FIG. 24.

Figure 24:
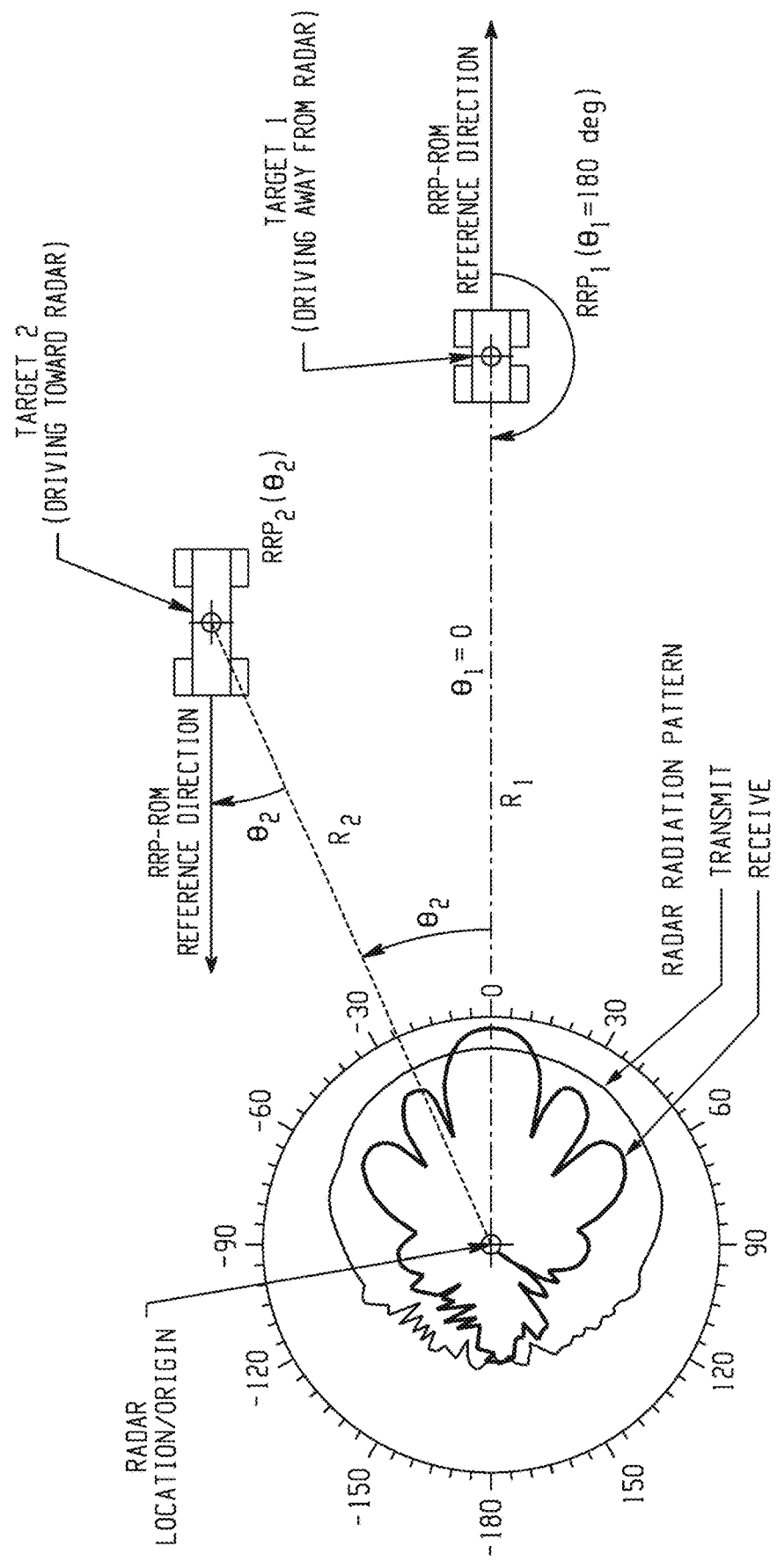

In FIG. 24, the radar pulse/chirp response for the illustrated closed-loop radar simulation may be expressed as:

$$IFFT$$
$$\left\{ RRP_1(\theta_1) * A_1 * e^{j2k(\overline{R_1}-\overline{R_{REF1}})} + RRP_2(\theta_2) * A_2 * \psi_t(\Theta_2) * e^{j2k(\overline{R_2}-\overline{R_{REF2}})} \right\},$$

where $$k = \frac{2\pi}{\lambda} = \frac{2\pi f}{c},$$

f is the center frequency, $\lambda$ is the center frequency wavelength, c is the speed of light, A is the magnitude scaling relative to distance change from $R_{REF}$ for each ROM, $\Psi t(\theta)$ is the transmit antenna radiation pattern at angle $\theta$, and $\Psi r(\theta)$ is the receive antenna radiation pattern at angle $\theta$.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The methods and systems described herein may be implemented using any suitable processing system with any suitable combination of hardware, software and/or firmware, such as described below with reference to the non-limiting examples of FIGS. 25, 26A, 26B and 26C.

Figure 25:
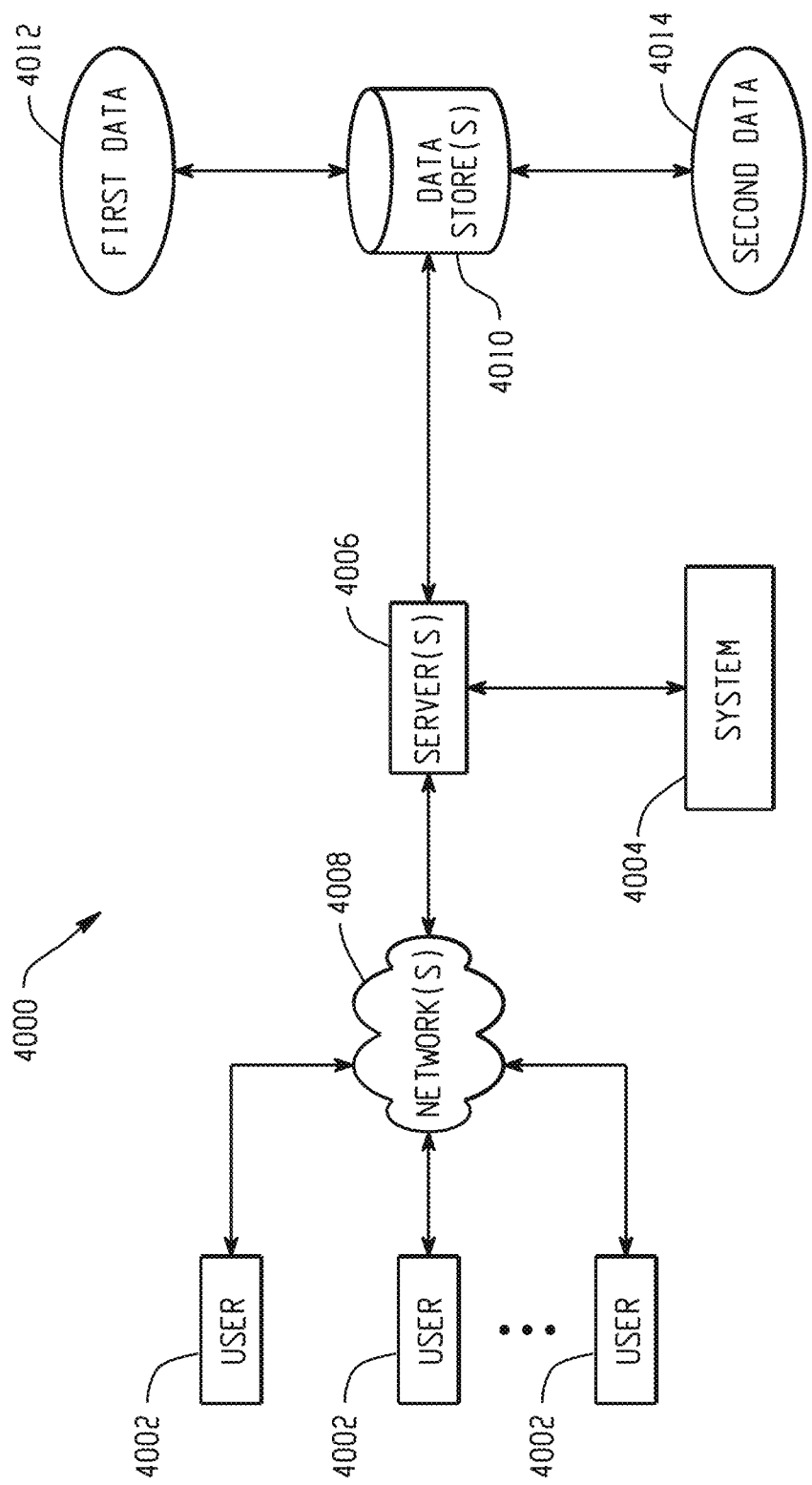
FIGS. 25, 26A, 26B and 26C depict example systems that may be used to implement the technology disclosed herein.

FIG. 25 depicts at 4000 a computer-implemented environment wherein users 4002 can interact with a system 4004 hosted on one or more servers 4006 through a network 4008. The system 4004 contains software operations or routines. The users 4002 can interact with the system 4004 through a number of ways, such as over one or more networks 4008. One or more servers 4006 accessible through the network(s) 4008 can host system 4004. It should be understood that the system 4004 could also be provided on a stand-alone computer for access by a user.

Figure 26A:
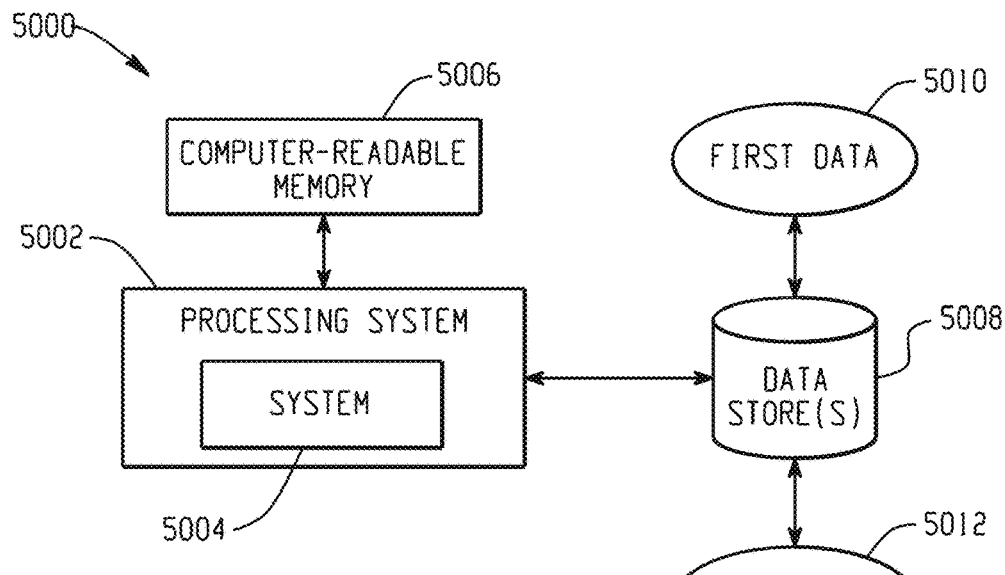
Figure 26B:
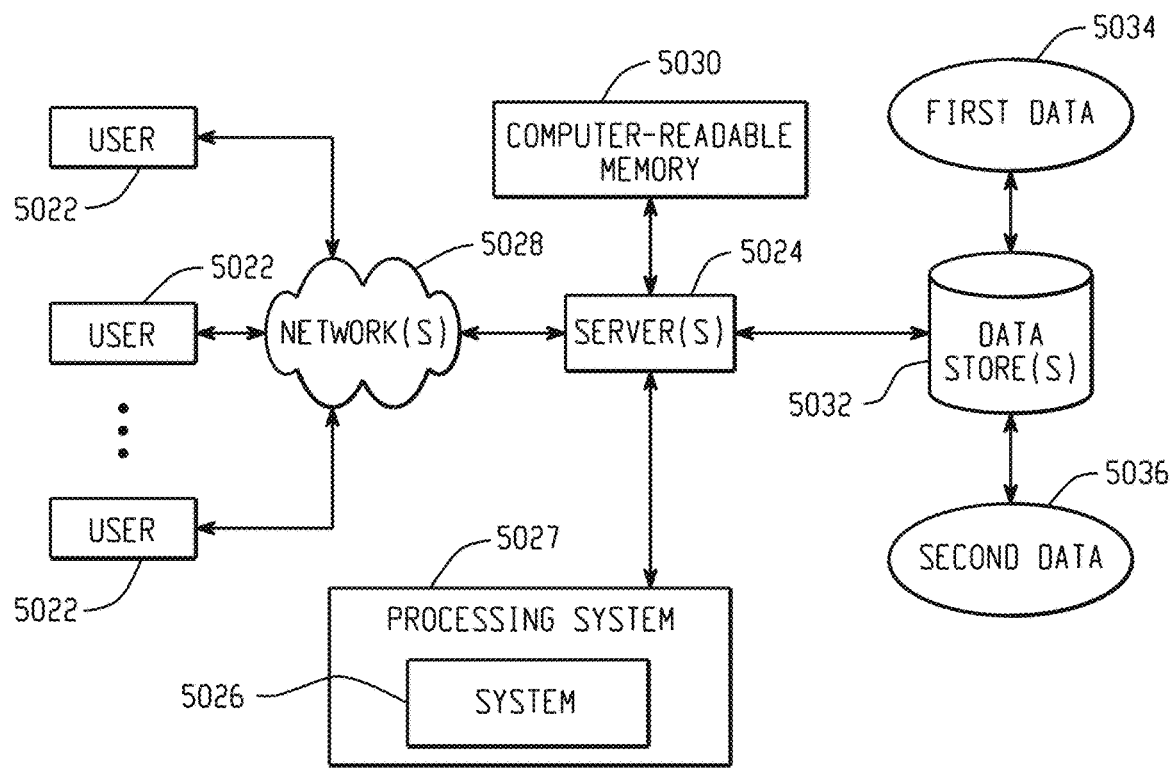
Figure 26C:
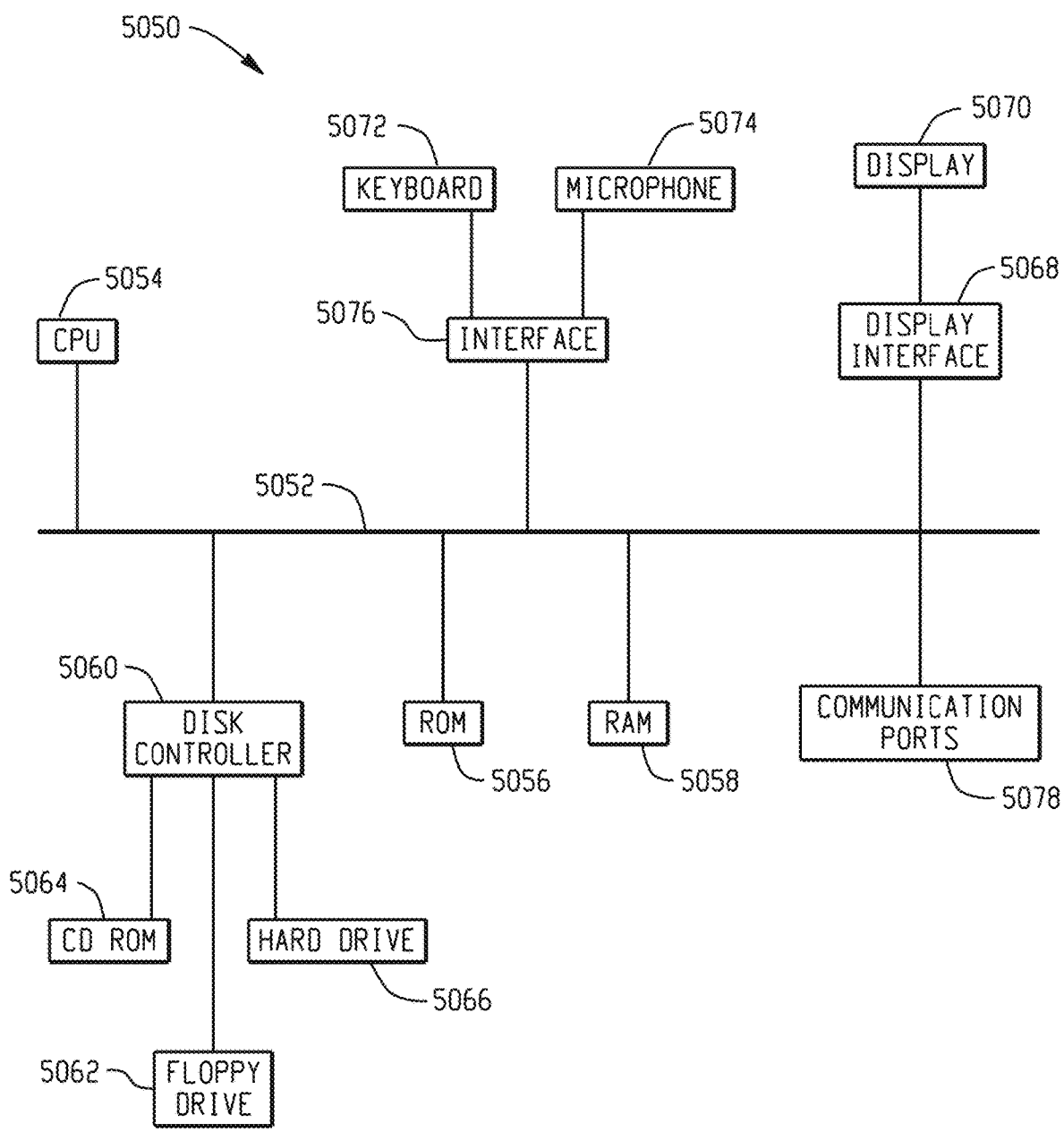

FIGS. 26A, 26B, and 26C depict example systems for use in implementing a system. For example, FIG. 26A depicts an exemplary system 5000 that includes a standalone computer architecture where a processing system 5002 (e.g., one or more computer processors) includes a system 5004 being executed on it. The processing system 5002 has access to a non-transitory computer-readable memory 5006 in addition to one or more data stores 5008. The one or more data stores 5008 may contain first data 5010 as well as second data 5012.

FIG. 26B depicts a system 5020 that includes a client server architecture. One or more user PCs 5022 accesses one or more servers 5024 running a system 5026 on a processing system 5027 via one or more networks 5028. The one or more servers 5024 may access a non-transitory computer readable memory 5030 as well as one or more data stores 5032. The one or more data stores 5032 may contain first data 5034 as well as second data 5036.

FIG. 26C shows a block diagram of exemplary hardware for a standalone computer architecture 5050, such as the architecture depicted in FIG. 26A, that may be used to contain and/or implement the program instructions of system embodiments of the present disclosure. A bus 5052 may serve as the information highway interconnecting the other illustrated components of the hardware. A processing system 5054 labeled CPU (central processing unit) (e.g., one or more computer processors), may perform calculations and logic operations required to execute a program. A non-transitory computer-readable storage medium, such as read only memory (ROM) 5056 and random access memory (RAM) 5058, may be in communication with the processing system 5054 and may contain one or more programming instructions. Program instructions may be stored on a non-transitory computer-readable storage medium such as magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 5060 interfaces one or more disk drives to the system bus 5052. These disk drives may be external or internal floppy disk drives such as 5062, external or internal CD-ROM, CD-R, CD-RW or DVD drives such as 5064, or external or internal hard drives 5066.

Each of the element managers, real-time data buffer, conveyors, file input processor, database index shared access memory loader, reference data buffer and data managers may include a software application stored in one or more of the disk drives connected to the disk controller 5060, the ROM 5056 and/or the RAM 5058. Preferably, the processor 5054 may access each component as required.

A display interface 5068 may permit information from the bus 5056 to be displayed on a display 5070 in audio, graphic, or alphanumeric formal. Communication with external devices may occur using various communication ports 5078.

In addition to the standard computer-type components, the hardware may also include data input devices, such as a keyboard 5072, or other input device 5074, such as a microphone, remote control, pointer, mouse and/or joystick.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method of generating a reduced-order high fidelity radar model for a target object, comprising:
receiving a target simulation model that represents one or more physical aspects of the target object;
receiving an environment simulation model that represents one or more physical aspects of an environment object;
receiving a target distance parameter that identifies a reference distance between the target object and a radar system to be simulated;
generating a simulation model based, at least in part, on the target simulation model, the environment simulation model, the reference distance, and characteristics of the radar system, and further based on a target aspect angle that identifies an angular position of the target object in relation to the radar system;
simulating interaction of the radar system with the target object and the environment object using the simulation model to generate a frequency domain range profile;
using results of the simulating to generate a range profile for the target object at the target aspect angle, wherein the range profile identifies a radar return strength for the reference distance, wherein the frequency domain range profile is converted to a time domain range profile, wherein the time domain range profile is window filtered as the range profile;
incrementing the target aspect angle;
repeating the generating, simulating, using and incrementing operations until range profiles are generated for the target object at a plurality of target angles amounting to a 360 degree rotation of the target object; and
accumulating the range profiles at the plurality of target angles to generate the reduced-order high fidelity radar model for the target object which identifies one or more of a bandwidth, frequency, or radar channel radiation pattern of the radar system.

2. The method of claim 1, wherein simulating interaction of the radar system with the target object and the environment object generates the frequency domain range profile for the target object at the target aspect angle.

3. The method of claim 2, wherein the frequency domain range profile is used as the range profile for the target object at the target aspect angle.

4. The method of claim 2, wherein the frequency domain range profile is converted into the time domain range profile for the target object at the target aspect angle.

5. The method of claim 4, wherein the time domain range profile is used as the range profile for the target object at the target aspect angle.

6. The method of claim 4, further comprising: applying a windowing filter to the time domain range profile; and converting the filtered time domain range profile into a filtered frequency domain range profile; wherein the filtered frequency domain range profile is used as the range profile for the target object at the target aspect angle.

7. The method of claim 4, wherein converting the frequency domain range profile into a time domain range profile comprises, applying an inverse-Fast-Fourier-Transform (FFT) to the frequency domain range profile to generate a time profile; and multiplying the time profile by the speed of light to generate the time domain range profile.

8. The method of claim 4, wherein converting the frequency domain range profile into the time domain range profile further comprises normalizing the time domain range profile to a center of the target object.

9. The method of claim 1, further comprising: receiving a radar model that represents the one or more characteristics of the radar system to be simulated, wherein the radar model is used in generating the simulation model.

10. The method of claim 9, wherein the radar model identifies each of the bandwidth, frequency, and radar channel radiation pattern of the radar system.

11. The method of claim 1, further comprising: generating the target simulation model based on the one or more real-world, physical aspects of the target object; and generating the environment simulation model based on the one or more real-world, physical aspects of the environment object.

12. The method of claim 8, wherein the one or more real-world, physical aspects of the target object include dielectric properties of the target object and the one or more real-world, physical aspects of the environment object include dielectric properties of the environment object.

13. The method of claim 8, wherein the one or more real-world, physical aspects of the target object include a conductivity of the target object.

14. The method of claim 1, wherein target object is a vehicle and the environment object is a road surface.

15. A method of performing a closed-loop radar sensor simulation, comprising:
receiving a plurality of radar models for target objects within a simulation environment, wherein the plurality of radar models are each generated using the method of claim 1;
for each target object within the simulation environment, identifying a target aspect angle for the target relative to a radar sensor within the simulation environment;
for each target object within the simulation environment, using the target aspect angle to identify a corresponding radar return strength from the radar model for the target object; and
for each target object within the simulation environment, scaling the radar return strength based on a position of the target object within the simulation environment relative to the radar sensor to generate a simulated radar return value.

16. The method of claim 15, further comprising: using the simulated radar return values to test control logic for a vehicular control or advance driver assistance system for a real-world physical vehicle.

17. The method of claim 15, wherein the plurality of radar models include frequency-domain data, the method further comprising: summing frequency-domain data from the plurality of radar modules to generate the simulated radar return value for each target object within the simulation environment.

18. A system for generating a reduced-order high fidelity radar model for a target object, comprising:
a radar system simulator configured to,
receive a target simulation model that represents one or more physical aspects of a target object,
receive an environment simulation model that represents one or more physical aspects of an environment object,
receive a target distance parameter that identifies a reference distance between the target object and a radar system to be simulated,
generate a simulation model based, at least in part, on the target simulation model, the environment simulation model, the reference distance, and characteristics of the radar system including one or more of a bandwidth, frequency, and radar channel radiation pattern of the radar system, and further based on a target aspect angle that identifies an angular position of the target object in relation to the radar system,
simulate interaction of the radar system with the target object and the environment object using the simulation model to generate a frequency domain range profile, and use results of the simulation to generate a range profile for the target object at the target aspect angle, wherein the range profile identifies a radar return strength for the reference distance, wherein the frequency domain range profile is converted to a time domain range profile, wherein the time domain range profile is window filtered as the range profile, and
repeat the simulation using the simulation model with incrementations of the target aspect angle until range profiles are generated for the target object at a plurality of target angles amounting to a 360 degree rotation of the target object;
wherein the range profiles at the plurality of target angles are accumulated to generate the reduced-order high fidelity radar model for the target object.

19. The system of claim 18, wherein the reduced-order high fidelity radar model for the target object includes frequency-domain data, and wherein the frequency-domain data for a plurality of reduced-order high fidelity radar models is combined and converted into time-domain data for use as a radar model for a multi-target environment.

20. The system of claim 18, wherein the simulation using the simulation model generates the frequency domain range profile for the target object at the target aspect angle, and the frequency domain range profile is converted into the domain range profile for the target object at the target aspect angle.

* * * * *